US012706325B2

(12) United States Patent
Lim

(10) Patent No.: US 12,706,325 B2
(45) **Date of Patent: *Aug. 11, 2026**

(54) ELECTROLYTE FOR ELECTROCHEMICAL DEVICE AND PREPARATION METHOD THEREFOR

(71) Applicant: GRAPHENIDE TECHNOLOGY CO., LTD., Gunpo-si (KR)

(72) Inventor: Hong Chul Lim, Suwon-si (KR)

(73) Assignee: GRAPHENIDE TECHNOLOGY CO., LTD., Gunpo-si (KR)

( * ) Notice: Subject to any disclaimer, the term of this patent is extended or adjusted under 35 U.S.C. 154(b) by 128 days.

This patent is subject to a terminal disclaimer.

(21) Appl. No.: 16/616,283

(22) PCT Filed: May 24, 2018

(86) PCT No.: PCT/KR2018/005922

§ 371 (c)(1),
(2) Date: Nov. 22, 2019

(87) PCT Pub. No.: WO2018/217043

PCT Pub. Date: Nov. 29, 2018

(65) Prior Publication Data

US 2020/0091557 A1 Mar. 19, 2020

(30) Foreign Application Priority Data

May 24, 2017 (KR) ........................ 10-2017-0064227
May 23, 2018 (KR) ........................ 10-2018-0058231

(51) Int. Cl.
*H01M 10/0568* (2010.01)
*H01M 10/0525* (2010.01)

(52) U.S. Cl.
CPC ... *H01M 10/0568* (2013.01); *H01M 10/0525* (2013.01); *H01M 2300/00* (2013.01)

(58) Field of Classification Search
CPC ....... B82Y 40/00; B82Y 30/00; C01B 32/182; C01B 32/198; C01B 32/192; B82B 3/00;
(Continued)

(56) References Cited

U.S. PATENT DOCUMENTS 5,569,560 A 10/1996 Olsen et al.
7,411,716 B2 8/2008 Oh et al.
(Continued)

FOREIGN PATENT DOCUMENTS

CN 102522219 A 6/2012
CN 106129469 A 11/2016
(Continued)

OTHER PUBLICATIONS

G. Leftheriotis et al., The effect of water on the electrochromic properties of WO3 films prepared by vacuum and chemical methods, Research, Feb. 23, 2004, pp. 115-124, vol. 83.
(Continued)

*Primary Examiner* — Imran Akram
(74) *Attorney, Agent, or Firm* — Venable LLP

(57) ABSTRACT

Disclosed are an electrolyte for an electrochemical device and preparation method thereof. The electrolyte can include a first electrode, a second electrode spaced apart from the first electrode and is filled between the first electrode and the second electrode, wherein the electrolyte further includes a salt form of a carbon quantum dot anion and a metal cation having an average diameter in the range of 2 to 12 nanometers (nm) and a surface potential of −20 mV or less, and the electrolyte has a very small dissociation energy of anion and cation, and thus improves ionic conductivity. And due to large ion polarization, and high anionic thermochemical/electrochemical stability of the electrolyte, no side reactions
(Continued)

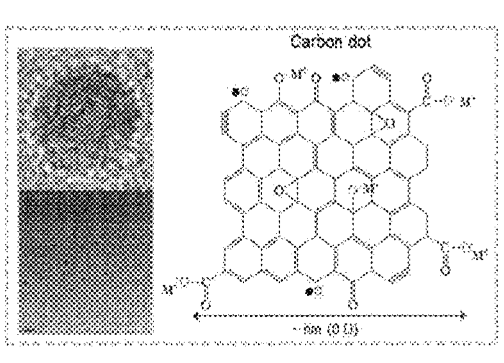

Counter cations
$K^+$
vs.
$Na^+$
vs.
$Li^+$ occur during device driving and it is possible to build an electrochemical device with greatly improved stability and reliability.

8 Claims, 22 Drawing Sheets

(58) Field of Classification Search
CPC ........... B82B 3/0009; H01L 31/035209; H01L 31/035218; H01M 4/625; H01M 4/663; H01M 4/926
See application file for complete search history.

(56) References Cited

U.S. PATENT DOCUMENTS

| | | | |
|---|---|---|---|
| 9,377,662 | B2 | 6/2016 | Lee et al. |
| 2005/0231785 | A1 | 10/2005 | Oh et al. |
| 2009/0152664 | A1* | 6/2009 | Klem .................. H01L 31/1013 257/466 |
| 2012/0077080 | A1 | 3/2012 | Liu et al. |
| 2012/0081773 | A1 | 4/2012 | Yeh et al. |
| 2012/0116094 | A1* | 5/2012 | Swager ..................... C07F 5/00 562/466 |
| 2013/0000727 | A1* | 1/2013 | Iwata .................... H01L 31/028 438/57 |
| 2013/0045499 | A1* | 2/2013 | Medintz ............... C07D 295/13 544/215 |
| 2013/0059174 | A1 | 3/2013 | Zhamu |
| 2013/0102084 | A1* | 4/2013 | Loh ........................ B82Y 40/00 204/157.43 |
| 2014/0002881 | A1 | 1/2014 | Kim |
| 2014/0158986 | A1* | 6/2014 | Leung ............. H01L 31/035227 977/932 |
| 2014/0182666 | A1* | 7/2014 | Teng ............... H01L 31/035218 136/265 |
| 2015/0118143 | A1 | 4/2015 | Jeon et al. |
| 2016/0033839 | A1 | 2/2016 | Lee et al. |
| 2016/0201206 | A1* | 7/2016 | Biswal ...................... C25B 1/02 136/256 |
| 2017/0029962 | A1* | 2/2017 | Manikoth ................. C25B 9/00 |
| 2017/0077429 | A1* | 3/2017 | Huang .................. H01L 51/426 |
| 2017/0301481 | A1 | 10/2017 | Chang et al. |
| 2017/0314141 | A1* | 11/2017 | Xu ............................ B82B 3/00 |
| 2017/0358757 | A1* | 12/2017 | Lee ...................... C01G 21/006 |
| 2018/0047928 | A1* | 2/2018 | Kim ...................... C07C 211/63 |
| 2018/0261709 | A1* | 9/2018 | Okada ............. H01L 31/035236 |
| 2018/0301714 | A1 | 10/2018 | Yang et al. |
| 2020/0091557 | A1* | 3/2020 | Lim .................. H01M 10/0565 |

FOREIGN PATENT DOCUMENTS

| | | | |
|---|---|---|---|
| KR | 10-2007-0071731 | A | 7/2004 |
| KR | 10-2006-0045803 | A | 5/2006 |
| KR | 10-2011-0003505 | A | 1/2011 |
| KR | 10-2012-0035834 | A | 4/2012 |
| KR | 10-2014-0003783 | A | 1/2014 |
| KR | 10-2015-0004124 | A | 1/2015 |
| KR | 10-2015-0047326 | A | 5/2015 |
| KR | 10-2015-0052008 | A | 5/2015 |
| KR | 10-1534313 | B1 | 7/2015 |
| KR | 10-2017-0064227 | A | 6/2017 |
| WO | 2010083041 | A1 | 7/2010 |
| WO | 2017-077381 | A2 | 5/2017 |

OTHER PUBLICATIONS

Nugent, J.L. et al., Nanoscale Organic Hybrid Electrolytes, Journal, Jul. 21, 2010, pp. 3677-3680.
Schaefer, J.L. et al., Nanoporous hybrid electrolytes, Journal, Jan. 10, 2011, pp. 10094-10101, vol. 21.
Nugent, JL et al., Ionic liquid-nanoparticle hybrid electrolytes, Journal, Jan. 4, 2012, pp. 4066-4071, vol. 22.
Huang, Jia-Qi et al., Permselective graphene oxide membrane for highly stable and anti-self-discharge lithium-sulfur batteries, Article, 2015, pp. 3002-3011, vol. 9, No. 3.
Guo, Wei et al., Bio-Inspired Two-Dimensional Nanofl uidic Generators Based on a Layered Graphene Hydrogel Membrane, Advanced Materials, Nov. 13, 2013, pp. 6064-6068, vol. 25(42).
Zhang, Su et al., Graphene quantum dots as the electrolyte for solid state supercapacitors, Scientific Reports 6, Jan. 14, 2016, pp. 1-7.
Zhang et al., Graphene quantum dots as the electrolyte for solid state supercapacitors, Scientific Reports, Jan. 14, 2016, vol. 6, No. 1.
Bak et al., "Graphene quantum dots and their possible energy applications: A review", Current Applied Physics, Elsevier, Amsterdam, NL, May 3, 2016, pp. 1192-1201, vol. 16, No. 9.
Hwang et al., "An Electrolyte-Free Flexible Electrochromic Device Using Electrostatically Strong Graphene Quantum Dot-Viologen Nanocomposites", Advanced Materials, Jun. 2, 2014, pp. 5129-5136, vol. 26, No. 30.
"A Basic Guide to Particle Characterization", Malvern Instruments Worldwide—White Paper, May 2, 2012, pp. 1-26.
Huang et al., "Permselective Graphene Oxide Membrane for Highly Stable and Anti-Self-Discharge Lithium-Sulfur Batteries", ACS publications, Feb. 16, 2015.
NJ Dudney, "Addition of a thin-film inorganic solid electrolyte (Lipon) as a protective film in lithium batteries with a liquid electrolyte", Journal of Power Sources, vol. 89, pp. 176-179 (2000).
Y. Lu et al., "Ionic liquid-nanoparticle hybrid electrotest", Journal of Materials Chemistry, vol. 22, pp. 4066-4072 (2012).
Hong Chul Lim, et al., "New Highly Stable Ionic Compounds Composed of Multivalent Graphene Quantum Dot Anions and Alkali Metal Cations", Batteries & Supercaps, 2021 pp. 1-8.

* cited by examiner

Electrochemical cell

WE : Pt disk electrode (2 mm diameter)
CE : Pt wire
RE : Ag/AgCl reference electrode lithium ion secondary battery comprising carbon quantum dot anion - metal cation electrolyte

ELECTROLYTE FOR ELECTROCHEMICAL DEVICE AND PREPARATION METHOD THEREFOR

FIELD OF THE INVENTION

The present invention relates to electrolyte for an electrochemical device and preparation method thereof, more particularly to electrolyte comprising a salt of a metal cation and a carbon quantum dot anion having an average diameter in the range of 2 to 12 nanometers (nm) and a surface charge of −20 mV or less, applied to an electrochemical device having a first electrode, a second electrode spaced apart from the first electrode and the electrolyte filled between the first electrode and the second electrode; and preparation method thereof.

BACKGROUND ART

In general, an electrolyte refers to a substance that imparts electrical conductivity to a solution and assists charge transfer during an electrochemical reaction. The electrolyte allows for the formation of a resistive contact between the electrode and the solution through the flow of ions and ion exchange, which is an essential component for the operation of the electrochemical device. The electrolyte does not participate in the oxidation/reduction reaction directly, but supports the electrochemical reaction. The electrolyte is generally in the form of a salt, which is usually used in a liquid by dissolving it in a solvent or gel form, but in some cases, it can be also dispersed in a solid.

The conventional electrochemical device has a problem in terms of stability because the electrode material constituting the internal electrode is in contact with the electrolyte and the reversibility of insertion and desorption of ions (H+, Li+, etc.) is broken. In the case of liquid electrolytes, which are mainly used, organic solvents are used in many cases. Organic solvents have stability problems such as ignition, evaporation, and leakage. On the other hand, solid state electrolytes are more stable than liquid electrolytes, but exhibit low ionic conductivity and have problems such as increased interfacial contact resistance and deterioration of devices.

Complex phenomena occur in electrolytes containing conductive salts. For example, when the salt concentration increases, the ion conductivity decreases due to the decrease in the diffusion coefficient of the ions due to the increase in the viscosity. In addition, it is difficult to secure the stability of the device due to side reactions with the electrode or other materials. In particular, there is a problem of lowering the reliability of the electrochemical device due to the low diffusion coefficient and the transport rate of the metal cation. When the diffusion coefficient of lithium ions is lower than that of the other cation constituting the electrolyte, it is difficult for lithium ions to approach the surface of the electrode and lithium ions cannot be inserted into the electrode. Therefore, the electrochemical reaction does not occur. $LiPF_6$ is mainly used as an electrolyte in lithium ion batteries because $LiPF_6$ has excellent overall physical properties such as ion mobility, ion pair dissociation, solubility, and SEI formation than the other electrolytes. However, $LiPF_6$ has problems such as poor thermal stability and side reactions even with a small amount of water. Moreover, when the temperature rises, the following side reactions accelerate the continuous decomposition of the electrolyte and induce the gas to inflate the battery and lead to explosion.

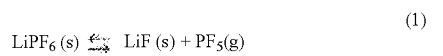

(1)

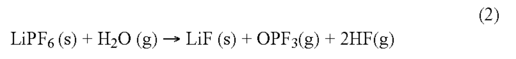

(2)

Electrochromic device (ECD) refers to a device that changes the light transmittance characteristics by changing the color of the electrochromic material due to the redox reaction in response to the application of an electric field. The most successful products are a rear view mirror of the car that automatically adjusts the glare of the light at the rear at night, and a smart window, a window that can be automatically adjusted according to the light intensity. The smart window changes to a darker color tone to reduce the amount of light in sunny day, whereas it changes to a lighter color tone on a cloudy day, which makes the energy saving efficiency excellent. In addition, the application of the ECD in display, such as an electronic board (e-book), etc. is continuously developing. The constitution of ECD is similar to that of a battery system. ECD have an electrochromic layer (anode)/electrolyte (Li+, H+)/relative electrode layer (cathode). Briefly explaining the principle of the electrochromic, it is colored when the cation such as Li+ or H+ and electrons are injected into the electrochromic layer (WxOy, MoxOy, etc.), which is a reducing coloring material, and becomes transparent when released from it. On the contrary, the positive electrode layer (VxOy, NixOy, etc.), which is an oxide coloring material, is colored when the cations such as Li+ and H+ and electrons are released from it, and becomes transparent when injected into that.

The electrochromic layer constituting the ECD is divided into a reducing coloring material and an oxidizing coloring material. The reducing coloring material, for example tungsten oxide, is a material that is colored when obtaining electrons. On the contrary, the oxidative coloring material is a material that is colored when the electrons are lost, and representative examples thereof include nickel oxide and cobalt oxide. In addition, representative electrochromic materials include inorganic metal oxides such as $V_2O_5$, $Ir(OH)_x$, $NiO_xH_y$, $TiO_2$, and $MoO_3$; conductive polymers such as PEDOT (poly-3,4-ethylenedioxythiophene), polypyrrole, polyaniline, polyazulene, polythiophene, polypyridine, polyindole, polycarbazole, polyazine and polyquinone; and organic coloring materials such as viologen, anthraquinone and phenocyazine. In order to improve the safety and coloration efficiency of the ECD, a method of direct coating of coloring material to a working electrode has been developed. In this case, the ion storage medium must be formed on the counter electrode and the electrolyte must be included between the two electrodes to complete the electric circuit of the ECD. Therefore, in order to realize a high efficiency, high stability of the ECD, it is necessary to improve the electrochemical properties of the electrolyte, the color change material, and the ion storage medium as well as the structure of the ECD. In the case of the ECD and the electroluminescent device, chelate complexes formation of the anion of the electrolyte with the color change material or the light emitting material reduce the reliability of the electrochemical device. In order to remedy these shortcomings, large complex anion structures and organic ligand anion structures are attracting attention. In addition, tungsten oxide, which has been studied extensively as an electrochromic material, causes irreversible chemical reaction with lithium ions embedded in an ECD, so that lithium ions are trapped in each layer of the ECD, and thus, each layer of the ECD is decomposed, splits into thin layers, and deteriorates the characteristics of the electrochromic device, and it can be deformed into a material that can no longer electrochromate or cause an electric leakage of the device, thereby losing its function as an electrochromic device. (NJ Dudney, J. Power Sources, 89 (2000) 17; G. Leftheriotis, S. Papaefthimiou, P. Yianoulis, Solar Energy Materials and Solar Cells, 83 (2004) 115).

Therefore, several suggestions have been proposed to solve these problems. Recently, solvent-free hybrid electrolytes based on nanoscale organic/silica hybrid materials (NOHM) with lithium salts have been reported [Nugent, J. L. et al, Adv. Mater., 2010, 22, 3677; Lu, Y. et al, J. Mater. Chem., 2012, 22, 4066]. This electrolyte has a uniformly dispersed nanoparticle core, to which the polyethylene glycol (PEG) chain is covalently bonded. This electrolyte is self-suspended to provide a homogeneous fluid, wherein the PEG oligomers simultaneously act as a suspension medium for the nanoparticle core and as an ion-conducting network for lithium ion transport. WO2010/083041 also discloses a NOHM based hybrid electrolyte comprising a polymer corona doped with a lithium salt, a polymer corona attached to an inorganic nanoparticle core. Chaefer, J. L. et al. (J. Mater. Chem., 2011, 21, 10094) also disclosed Si02 nanoparticle hybrid electrolyte covalently binding to dense brushes of oligo-PEG chains doped with lithium salts, in particular lithium bis (trifluoromethanesulfonimide). This electrolyte is made from polyethylene glycol dimethylether (PEGDME) and provides good ion conductivity. However, the negative ions of lithium salts move freely through the electrolyte, and two-thirds of the current is carried by the negative ions, resulting in high polarization, thus causing internal resistance and voltage losses. In Korean Patent Publication No. 10-2015-0004124, Nanoparticulate organic hybrid materials are disclosed, characterized in that having a nanoparticulate organic containing inorganic nanoparticles covalently grafted with one or more anions of organic sodium salt or organic lithium salt through a linker group as bellows;

(I)

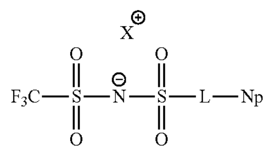

Wherein Np represents an inorganic nanoparticle; L is a linker group selected from a C1-C6 alkylene group and a phenyl-C1-C4-alkylene group; and

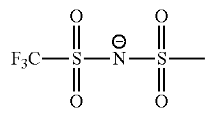

is anion of an organic sodium salts or organic lithium salt and; X+ is sodium or lithium cation. Also, Korean Patent Laid-Open Publication No. 10-2011-0003505 disclosed an electrolyte comprising a solvent having chemical structure like bellows;

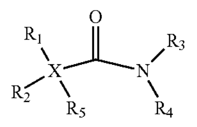

(wherein X is C, N, O or aryl having substituent on aryl ring, provided that $R_2$ does not exist when X is a nitrogen, both $R_1$ and $R_2$ does not exist when X is an oxygen, and when R is an aryl group, none of $R_1$, R2 and R 5 are present; R1 is a hydrogen atom or a carbon-based group; R2 is a hydrogen atom or a carbon-based group; R3 is a hydrogen atom or a carbon-based group; R4 and R5 are individually selected from hydrogen atoms or carbon-based groups, or R4 and R5 together form a carbon-based group to give a ring structure.); and a mixture comprising ionizable materials forming a solution with the solvent, characterized by solvating a polymer in the mixture.

However, the electrolytes for the conventional ECD including the above-mentioned document are deteriorated due to its weak durability, the anion and/or cation of the electrolyte constituting the ionic salt react with the material constituting the electrochemical device (electrode, material participating in the oxidation/reduction reaction) reduces the durability of the electrochemical device.

On the other hand, the ionic conductivity of the electrolyte can be expressed as the charge amount×mobility. When the charge amount is low, the ionic conductivity is lowered. This means that the resistance of the electrochemical device is increased. If the applied voltage is increased or the ion salt concentration is increased to overcome this resistance, the durability of the device is deteriorated. $LiPF_6$, one of the lithium salts commonly used, shows that the fluorine of the hexafluorophosphate anion reacts with water to generate hydrogen fluoride (HF) or precipitation such as or LiF, which is one of the important factors that lower the reliability and stability of the lithium secondary battery. In addition, when the ionic salt is increased, cations and anions are accumulated in the cathode and the anode, respectively, by the electric field formed on the electrode. This worsens the polarization and voltage drop in the device, thereby reducing device efficiency. It shows that it is difficult to increase the ion conductivity by increasing the concentration of lithium salts. Therefore, it is necessary to develop a new salt (electrolyte) structure with excellent thermal and electrochemical stability and ionic conductivity.

The commercialized lithium ion battery is known to be difficult to be used as a large-scale power storage device due to the scarcity of lithium resources and the resulting cost increase. In addition, the formation of dendrites of lithium metal in batteries has a problem of stability causing internal overheating and/or combustion. In order to solve this problem, studies are being conducted to use metal cations such as sodium ($Na^+$), potassium ($K^+$), and magnesium ($Mg^{2+}$). However, due to the difficulty in finding the electrode material suitable for such metal cations, low ion conductivity and low energy density, another metal ion battery has not been commercialized yet. Therefore, a new type of electrolyte for high performance electrochemical devices is required, with no risk of explosion and ignition. Also, the properties for the new electrolyte is required to be inflammable, non-volatile, non-toxic, etc. for safety in use and after disposal. Several classes of electrolytes with inorganic or organic properties have been studied as replacements for conventional liquid electrolytes. Typical materials used in the preparation of polymers, polymer composites, hybrids, gels, ionic liquids, ceramics or solid electrolytes are inorganic matrices derived from nanoparticle oxides such as (3-alumina and such as Nasicon and silicon dioxide. It may be a simple lithium halide with improved grain boundaries defects or sulfide glass in a $SiS_2$+$Li_2S$+LiI system. However, due to the low ion conductivity (~$10^{-4}$ S/cm) and low energy density of gels and solid electrolytes, they are not widely commercially available.

For example, magnesium (Mg) secondary batteries, one of the next generation ion battery candidate, is paid attention due to high energy density/high output and not-forming dendritic growth on the electrode surface during the charging/discharging process. However, magnesium cathode is incompatible with conventional inorganic ionic salts. Moreover, owing to brittleness of magnesium, unavoidable volume changes in operation, which may causes stress and cracking in the electrolyte.

In order to overcome the volume change in operation, it is preferable to use an organic polymer matrix in electrolyte. Typical polymer examples may include polyethylene oxide, polypropylene oxide or polyethyleneimine and copolymers thereof. These materials are used in combination with suitable lithium salts such as lithium bis (trifluoromethanesulfonyl imide [Li(CF3S02) 2N](LiTFSI), and lithium tetrafluoroborate (LiBF4). The main disadvantage of the electrolyte is its ambipolar conductivity: When current is applied, both the anion and the cation are mobile such that about one third of the current through the electrolyte is carried by the cation and two thirds by the anion. Transport number t+ is defined as bellows;

$$t+=\sigma cation/\sigma cation+\sigma anion=D\ cation/D\ cation+D\ anion,$$

wherein σ and D are defined as conductivity and diffusion coefficient of each charged species, respectively. In most battery electrode systems, only cations react at the electrode, so that electric neutrality accumulates salts around the anode, whereas salts near the cathode are depleted. Since inhomogeneity of electrolytes induces very low conductivity, the polarization of the cell increases significantly with decreasing power capacity. For example, U.S. Pat. No. 5,569,560 disclosed the use of an anionic complexing agent comprising a polyamine with a strong electron-removing unit $CF_3S0_2$ attached in order to slow the anion, whereby lithium cations are used on a larger scale in electrochemical cells. However, the effect on the transport rate t+ is negligible. In recent year, solvent-free hybrid electrolytes based on nanoscale organic/silica hybrid materials (NOHM) with lithium salts have been developed (Nugent, J L et al, Adv. Mater., 2010, 22, 3677; Lu, Y. et al, J. Mater. Chem., 2012, 22, 4066). This electrolyte has a nanoparticle core bonded to polyethylene glycol (PEG) chain. This electrolyte is self-suspended to provide a homogeneous fluid, wherein the PEG oligomers act as a suspension medium for the nanoparticle core and as an ion-conducting network for lithium ion transport simultaneously. WO2010/083041 also discloses a NOHM based hybrid electrolyte comprising a polymer corona doped with a lithium salt, a polymer corona attached to an inorganic nanoparticle core. Chaefer, J. L. et al. (J. Mater. Chem., 2011, 21, 10094) also disclosed $Si0_2$ nanoparticle hybrid electrolyte covalently binding to dense brushes of oligo-PEG chains doped with lithium salts, in particular lithium bis (trifluoromethanesulfonimide). This electrolyte is made from polyethylene glycol dimethylether (PEGDME) and provides good ion conductivity. However, the negative ions of lithium salts move freely through the electrolyte, and two-thirds of the current is carried by the negative ions, resulting in high polarization, thus causing internal resistance and voltage losses.

Thus, there have been several attempts to solve the above problems. Korean Patent Laid-Open Publication No. 10-2015-0052008 discloses nanoparticulate organic hybrid materials comprising inorganic nanoparticles covalently grafted with one or more anions of an organic sodium salt or an organic lithium salt via a linker group. In recent years, a paper has been published that reports supercapacitance characteristics using graphene quantum dots as an electrolyte ("Graphene quantum dots as the electrolyte for solid state supercapacitors" (Sci. Rep., 2015, 6, 19292)). However, there has been no report on the electrochemical characteristics of supercapacitors when using graphene quantum dots as an electrolyte, and there are no examples of applying graphene quantum dots to electrochemical devices using electrodes on which electrochemical reactions occur.

DISCLOSURE OF INVENTION

Therefore, the object of the present invention is to provide an electrolyte for an electrochemical device having an electrode on which the redox reaction occurs that can prevent decomposition or deformation of the electrode material or ionic salt, so that deterioration of the electrochemical device stability and performance can be prevented, electrochemical durability can be improved and the efficiency and performance of the electrochemical device can be improved, manufacturing method thereof and an electrochemical device comprising the electrolyte.

In order to achieve the above object, the present invention provides an electrolyte for an electrochemical device including a first electrode, a second electrode spaced apart from the first electrode and an electrolyte filled between the first electrode and the second electrode, wherein the electrolyte comprises a salt form of a metal cation and a carbon quantum dot anion having an average diameter in the range of 2 to 12 nanometers (nm) and a surface potential of −20 mV or less.

The present invention also provides an electrolyte for electrochemical device, characterized in that the metal is an alkali metal, alkaline earth metal or transition metal.

The present invention also provides an electrolyte for an electrochemical device, characterized in that the metal is at least one selected from the group consisting of Li, Na, K, Mg and Zn.

The present invention also provides an electrolyte for an electrochemical device, characterized in that a reversible electrochemical redox reaction occurs in at least one of the first electrode and the second electrode.

In addition, the present invention provides an electrolyte for an electrochemical device, characterized in that the electrochemical device is one selected from the group consisting of a secondary battery, a solar cell, an electrochromic device and an electroluminescent device.

In addition, the present invention provides an electrolyte for an electrochemical device, characterized in that the secondary battery is a lithium ion battery or a lithium polymer battery.

In order to achieve another object of the present invention, the present invention provides a method for preparation of an electrolyte for an electrochemical device comprising the step of i) mixing the carbon precursor and the acid and hydrothermally synthesizing in the range of 80 to 120° C. to produce a carbon quantum dot having an average diameter in the range of 2 to 12 nanometers (nm) and the surface potential of −20 mV or less; ii) preparing a carbon quantum anion-metal cation salt by reacting the carbon quantum dot with a metal ion; iii) removing the reaction impurities and; iv) classifying the carbon quantum dot ionic compounds according to size.

The present invention also provides a method for preparation of an electrolyte for an electrochemical device, characterized in that the metal is an alkali metal, alkaline earth metal or transition metal.

In addition, the present invention provides a method for preparation of an electrolyte for an electrochemical device, characterized in that the metal is at least one selected from the group consisting of Li, Na, K, Mg and Zn.

Effects of the Invention

The electrolyte for an electrochemical device according to the present invention has a very small dissociation energy of anion and a cation, and thus improves ionic conductivity. Due to large ion polarization, and high anionic thermochemical/electrochemical stability, no side reactions occur during device driving, it is possible to build an electrochemical device with greatly improving the stability and reliability.

BEST MODE FOR CARRYING OUT THE INVENTION

Hereinafter, the present invention will be described in detail referring the accompanying drawings as below.

In the present specification, the term 'electrochemical device' refers to a device comprising a first electrode, a second electrode spaced apart from the first electrode and forming an electrically opposite to the first electrode, and electrolyte filled between the first electrode and the second electrode, wherein an electrochemical reaction is performed and a reversible electrochemical redox reaction occurs at the one or both of the first electrode and the second electrode. And the term 'carbon quantum dot' refers to a quantum dot in the form of graphite oxide having at least one oxygen functional group capable of becoming anions on the surface and/or the edge thereof and having an average diameter in the range of 2 to 12 nm and the surface potential of −20 mV or less; or quantum dots derivatives produced by reacting the quantum dot with polymerizable group. And the term 'carbon quantum dot anion' refers to a carbon quantum dot of the oxygen functional group anionized. In the present invention, the first electrode may be a working electrode or an anode, and the second electrode forming an electrically opposite of the first electrode may be a counter electrode or a cathode. Reversible electrochemical redox reaction occurs at one or both of the first electrode and the second electrode. The electrochemical device of the present invention comprises a first electrode (working electrode), a second electrode (counter electrode) spaced from the first electrode and a electrolyte filled between the first electrode and the second electrode. The electrochemical device of the present invention may be any electrochemical device, such as an electrochromic device, an electrochemical light emitting device, a secondary battery or a solar cell, that reversibly undergoes an electrochemical redox reaction at a working electrode (material) or a cathode.

Figure 1A:
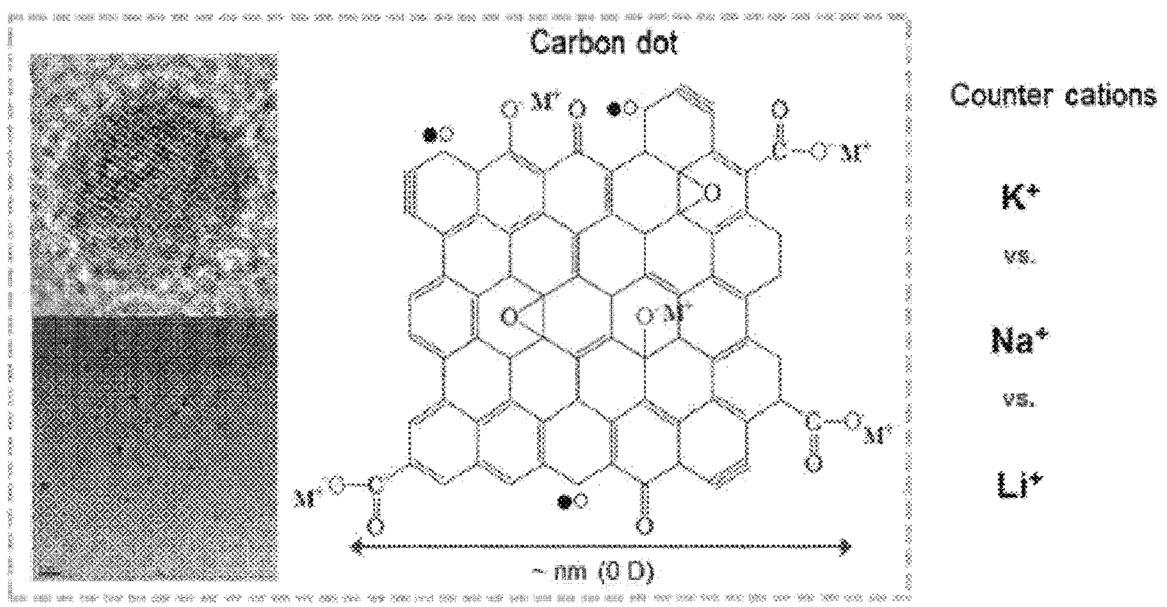
FIG. 1 (*a*) is the electron microscope image and a schematic diagram of the structure of the carbon quantum dot ionic compound, (b) is a graph showing the absorption and emission profiles of the carbon quantum dot ionic compound of an electrolyte for an electrochemical device according to the present invention.
Figure 1B:
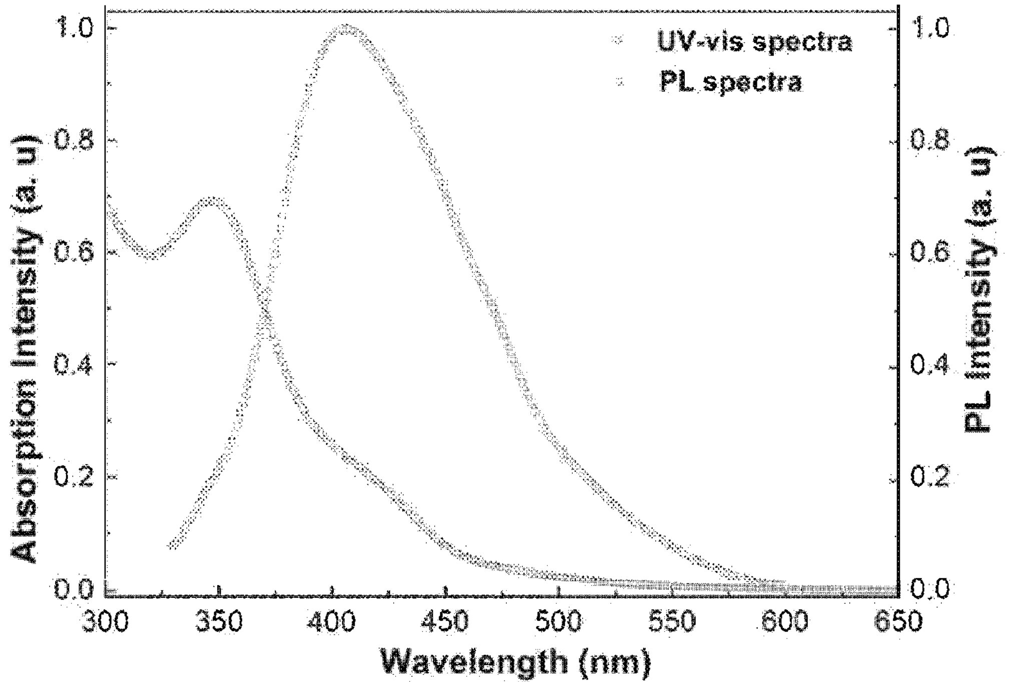
Figure 2:
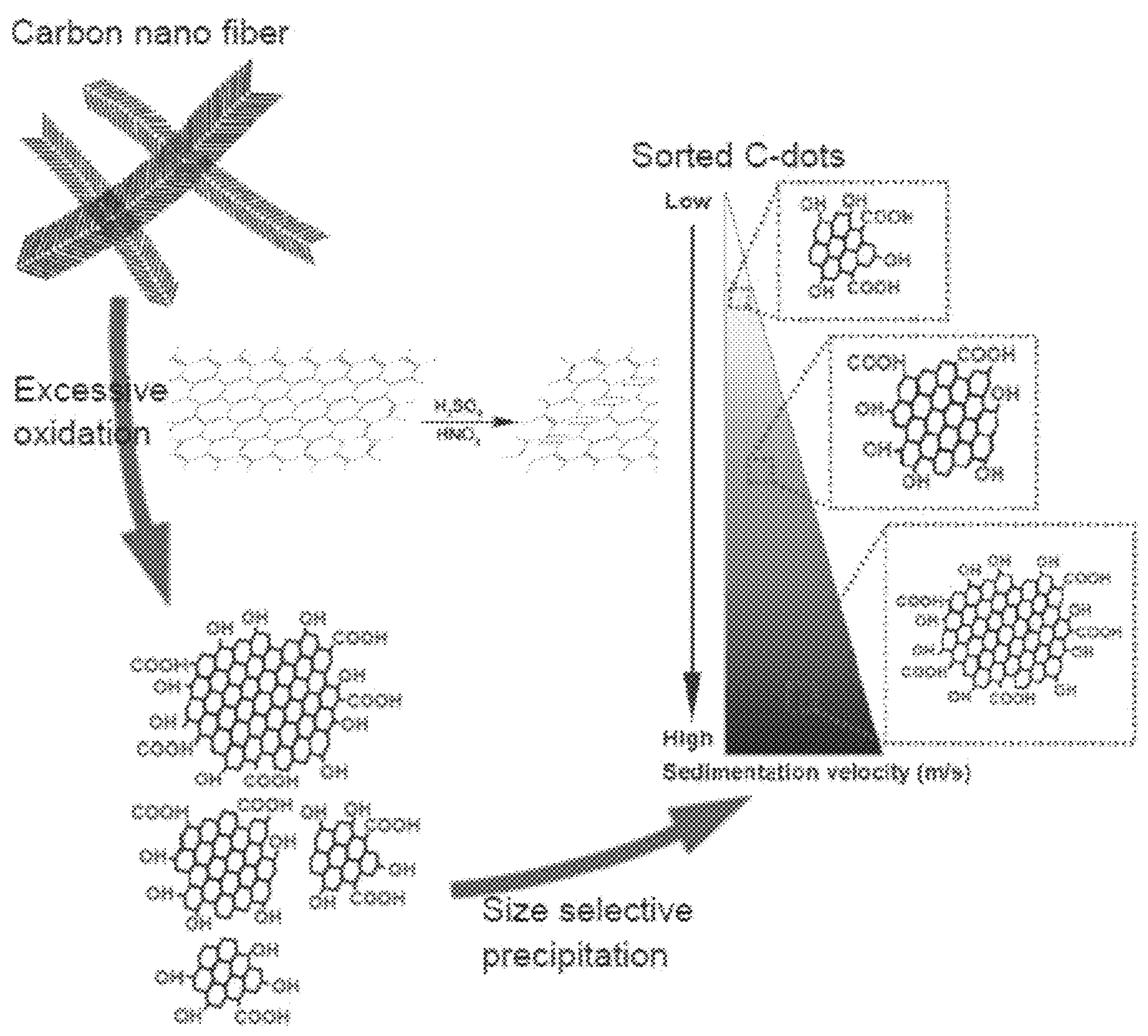
FIG. 2 is a schematic diagram for explaining a manufacturing process of a carbon quantum dot for preparation of an electrolyte for an electrochemical device of the present invention.

FIG. 1 (*a*) is the electron microscope image and a schematic diagram of the structure of the carbon quantum dot ionic compound, (*b*) is a graph showing the absorption and emission profiles of the carbon quantum dot ionic compound of an electrolyte for an electrochemical device according to the present invention and FIG. 2 is a schematic diagram for explaining a manufacturing process of a carbon quantum dot for preparation of an electrolyte for an electrochemical device of the present invention. As shown in FIG. 1, the carbon quantum dot ionic compound electrolyte of the present invention is a metal salt compound of a carbon quantum dot polyvalent anion and a metal cation in which the carbon quantum dot anion and the metal cation are paired. The carbon quantum dot anion of the present invention has a form of a polyanionic ($A^{n-}$), aromatic ring structure inside and oxygen functional groups on the surface and edge. The carbon quantum dot anion is combined with a metal cation to form a salt type ionic compound. The electrolyte for an electrochemical device of the present invention including the carbon quantum dot ionic compound is expected as follows; 1) Due to the surface negative charges, ionic bonds with various metal cations such as alkali metals, alkaline earth metals, and transition metals are possible. 2) Large size and large surface charges, which have a large polarity and low lattice energy. 3) Delocalization of the electron cloud is large due to resonance of the internal structure. In addition, 4) it is a macromolecular anion, so there is almost no mass transport in the solution, and 5) there is no side reaction at the electrode interface due to electrochemical/thermal stability, thereby improving device reliability. The carbon quantum dot ionic compound of the present invention is not only easy to disperse in aqueous solutions and non-aqueous solvents, but also relatively free of mixing with organic solvents having low viscosity, low volatility, and high permittivity. Through above mentioned characteristics, the electrolyte of the present invention is deemed to have a high ionic conductivity.

In the carbon quantum dot ionic compound of the present invention, the metal cation may be an alkali metal, an alkaline earth metal or a transition metal cation, and examples thereof may be Li, Na, K, Mg, or Zn. The carbon quantum dot ionic compound can be used in liquid, gel, solid form, and it is possible to adjust the appropriate content thereof according to the concrete usage.

The carbon quantum dot ionic compound may form an organic-inorganic complex by reacting with a derivative compound. The derivative compound is not particularly limited and may be any compound capable of inducing polymerization. For example, a silane compound may be added to the prepared carbon quantum dot ionic compound, and a gel electrolyte may be prepared using a thermal crosslinking method.

The carbon quantum dot used in the preparation of the electrolyte for an electrochemical device of the present invention has an average diameter in the range of 2 to 12 nm, more preferably in the range of 5 to 8 nm, an oxygen functional group being capable of an anion on the surface and/or the edge thereof, and a surface potential of less than or equal to −20 mV. If the average diameter of the carbon quantum dot is less than 2 nm, the carbon quantum dot anion is moved to the anode by the potential formed on the electrode of the electrochemical device, which decreases the t+(ion transport number), resulting in a decrease in the efficiency of the electrochromic device and it will reduce the lattice energy of the carbon quantum dot resulting in ionic conductivity reduction. On the other hand, when the average diameter of carbon quantum dots is 12 nm or more, the π-π interaction between the carbon quantum dots increases, which causes aggregation and crystallization of carbon quantum dots in the electrochemical device and degrade the reliability of the device. In addition, it is preferable to adjust pH of the solution of the carbon quantum dot ionic compound of the present invention in the range of 3 to 14 when dissolved in a solvent. pH control is adjusted according to the characteristics of the electrochemical device. For example, in the case of an electrochromic device to which a Prussian blue material is applied, when the pH of the electrolyte solution is 5 or more, the electrochromic device may be disordered due to deformation of the color change material. On the other hand, especially in the case of lithium secondary batteries, the oxidative decomposition of the electrolyte is accelerated in an acidic atmosphere. Thus, an electrolyte for an electrochemical device should have acid and basic resistance at the same time. The electrolyte for an electrochemical device of the present invention has a strong resistance not only to acids but also to base, so that there are very few restrictions on the use environment. Owing to this excellent chemical resistance, the electrolyte of the present invention is also suitable for bio experiments.

FIG. 2 is a schematic diagram for explaining a manufacturing process of a carbon quantum dot for preparation of an electrolyte for an electrochemical device of the present invention. As shown in FIG. 2, the preparation method of electrolyte for the electrochemical device of the present invention comprises the steps of i) mixing the carbon precursor and the acid and hydrothermally synthesizing in the range of 80 to 120° C. to produce a carbon quantum dot having an average diameter in the range of 2 to 12 nanometers (nm) and the surface potential of −20 mV or less; ii) preparing a carbon quantum anion-metal cation salt by reacting the carbon quantum dot with a metal ion; iii) removing the reaction impurities and; iv) classifying the carbon quantum dot ionic compounds according to size.

The preparation method of the present invention comprises the steps of i) mixing the carbon precursor and the acid and hydrothermally synthesizing in the range of 80 to 120° C. to produce a carbon quantum dot having an average diameter in the range of 2 to 12 nanometers (nm) and the surface potential of −20 mV or less. Above step I) of the present invention is supposed to be well known as carbon quantum dot manufacturing method to a skilled person in the art, it will not be described in detail further herein. However, in this step, the inventors of the present invention have found that the carbon quantum dot properties (size, surface charge value) can be adjusted by varying the reaction temperature. For example, according to hydrothermal synthesis temperature at 80, 100 and 120 degrees respectively in the embodiment of the present invention, the surface charges are −17, −23, and −28 mV, respectively, and the average diameters of the carbon quantum dot are 10, 8, and 5.5 nm, respectively.

The preparation method of electrolyte of the present invention comprises the step of ii) preparing a carbon quantum anion-metal cation salt by reacting the carbon quantum dot with a metal ion. The source of the metal ions is not particularly limited, only if a metal salts showing predetermined solubility in aqueous solution, for example, metal hydroxides and metal carbonates, may be used. Specifically, concrete sources of the metal ions include potassium hydroxide, sodium hydroxide, lithium hydroxide, cesium hydroxide, potassium carbonate and the like. At this time, the metal cation present in the carbon quantum dot anion can be selected according to the type and amount of the metal cation precursor to be added, and the pH and concentration of the solution can be adjusted. For example, in the case of $(C\text{-dot})_{1-nx}^{-}K_{nx}^{+}$ ion compound, 150 ml of 5 M KOH was injected into a solution in which the prepared carbon quantum dot was dissolved to prepare a K+ concentration of 0.5 M and a pH 3 solution.

The preparation method of electrolyte for an electrochemical device of the present invention comprises the step of iii) removing the reaction impurities. After ii) step reaction, it is necessary to remove impurities such as unreacted carbon precursor from the solution. The removal of impurities is not particularly limited, in the embodiment of the present invention, the fractional crystallization or fractional precipitation is used. In order to remove impurities (carbon quantum dot anion, salt etc.), a water-soluble organic solvent (ethanol, methanol) is mixed with the solution prepared earlier, 1:1 v/v %, then white solid masses precipitate in this process. In order to take only the supernatant, the solution was treated 30 minutes using an ultracentrifuge at 13,000 RPM. Repeat above steps 2 to 3 times to remove impurities by taking only the supernatant until no longer precipitation is produced.

In preparation method of the present invention, the carbon quantum dot anion-metal cation ion compound obtained is classified according to size. The classification technique of the carbon quantum dot ionic compound by size is not particularly limited, and in the exemplary embodiment of the present invention, a carbon quantum dot ionic compound having a specific molecular weight or size is obtained by using dialysis. Through above process, a carbon quantum dots ionic compound dispersed in an organic solvent can be prepared as well as an aqueous solution. The size and metal cation concentration of the finally obtained carbon quantum anion-metal cation ion compound were confirmed using transmission electron microscope and inductively coupled plasma (ICP), respectively. Electrolyte of the present invention can be dissolved in water-soluble solvents (methanol, ethanol), non-aqueous solvents (acetonitrile, dimethyl carbonate, ethylene carbonate), and an aqueous solution and used in the liquid phase, optionally dispersed in a suitable dispersion medium/matrix dispersed as a gel form.

The present invention will be described below in greater detail in connection with preferred embodiments of the present invention. It should be noted that the following embodiments are provided merely for better understanding of the invention and the scope of the present invention is not limited only to the embodiments.

Example 1 (Manufacture of Carbon Quantum Dot Electrolyte)

Figure 3:
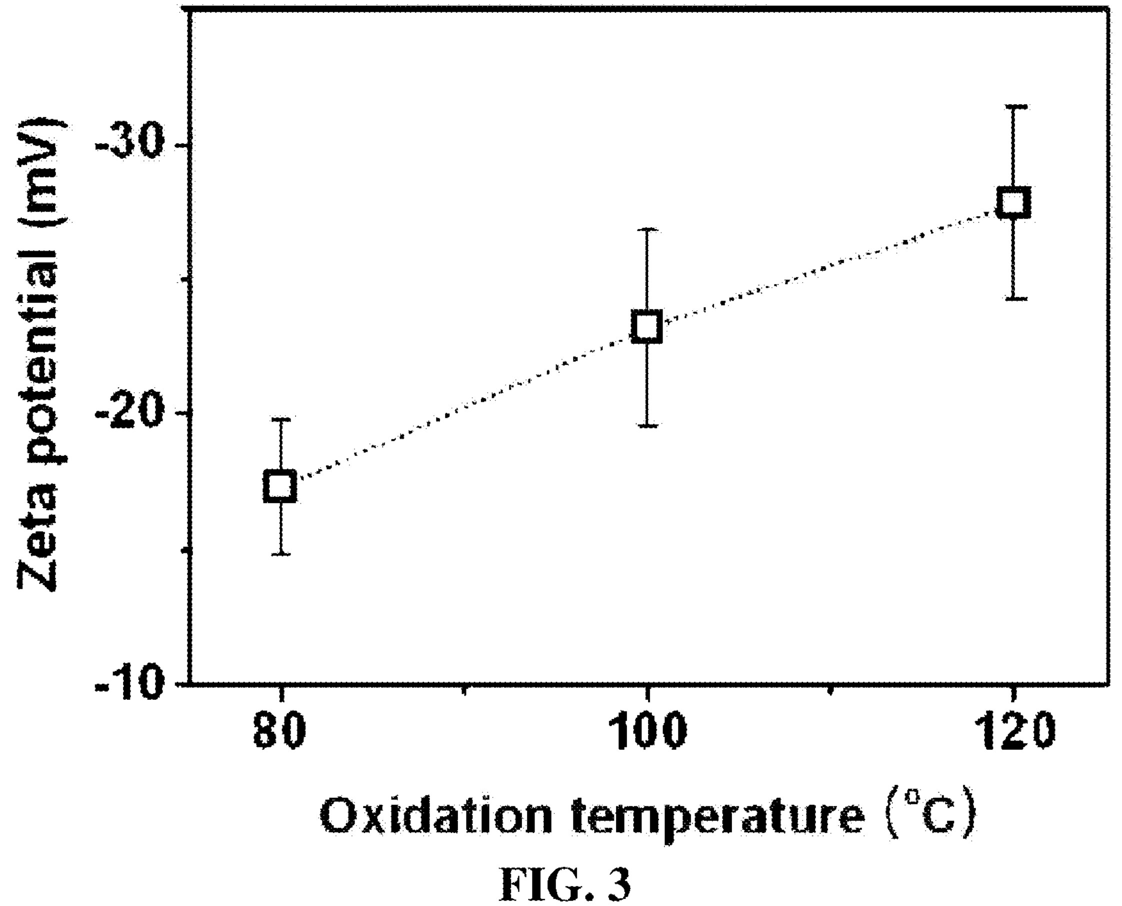
FIG. 3 shows the result of measuring the surface charge intensity of the carbon quantum dot obtained according to different reaction temperature in Example 1 of the electrolyte for an electrochemical device of the present invention.

0.1 g of the carbon precursor was injected into 20 ml of acid (sulfuric acid:nitric acid, 3:1 v/v %). In this case, sonication was performed at room temperature for 1 hour to disperse the carbon precursor. Then, the mixture was hydrothermally synthesized 24 hours with stirring. Carbon quantum dot properties (size, surface charge value) can be controlled by varying the reaction temperature at 80, 100, and 120 degrees, respectively in respective hydrothermal synthesis. FIG. 3 is the result of measuring the surface charge of the carbon quantum dot obtained by the reaction temperature. As shown in FIG. 3, the surface charges of carbon quantum dots prepared at the respective temperatures are −17, −23 and −28 mV, and the average diameters are 10, 8 and 5.5 nm respectively. In order to prepare carbon quantum dot anion-metal cation ionic compounds, base such as potassium hydroxide, sodium hydroxide, lithium hydroxide, cesium hydroxide, potassium carbonate, and the like were added to the carbon quantum dot solution, respectively. The metal cation present in the carbon quantum dot anion can be selected according to the type and amount of the metal cation precursor to be added, and the pH and concentration of the solution can be adjusted. For example, in order to prepare a solution having a K+ concentration of 0.5 M and a pH 3 solution of $(C\text{-dot})_{1-nx}^{-}K_{nx}^{+}$ ion compound, (1) 150 ml of 5 M KOH was injected into a solution containing the above prepared carbon quantum dot. (2) In order to remove impurities (carbon quantum anion, salt), a water-soluble organic solvent (ethanol, methanol) is mixed 1:1 v/v % with the previously prepared solution. In this process, white solid masses precipitated. (3) To separate and take only the supernatant of the mixed solution, the mixed solution was treated for 13,000 RPM, 30 minutes using an ultracentrifuge. (4) Repeat the process 2 to 3 to take only the supernatant where no precipitate is formed anymore. In order to obtain a carbon quantum dot ionic compound having a specific molecular weight or size, carbon quantum dot anion-metal cation ion compound containing supernatant was undergone dialysis. More specific method of permeation is as follows. Pretreatment was performed by (1) Soaking the membrane of 1 K~12 K pore size in tertiary distilled water for 15 minutes. (2) dipping at 80° C. for 30 minutes in 10 mM $NaHCO_3$ solution, (3) in 10 mM $Na_2EDTA$ for 30 minutes, and finally (4) dipping water in tertiary distilled water for 80° C. for 15 minutes, consecutively. (5) Inject the carbon quantum dot ionic compound into the pretreated membrane and immerse it in the solvent to be used. Through above process, a carbon quantum dots ionic compound dispersed in an organic solvent can be prepared as well as an aqueous solution. The size and metal cation concentration of the finally obtained carbon quantum anion-metal cation ion compound were confirmed using transmission electron microscope and inductively coupled plasma (ICP), respectively.

Figure 4A:
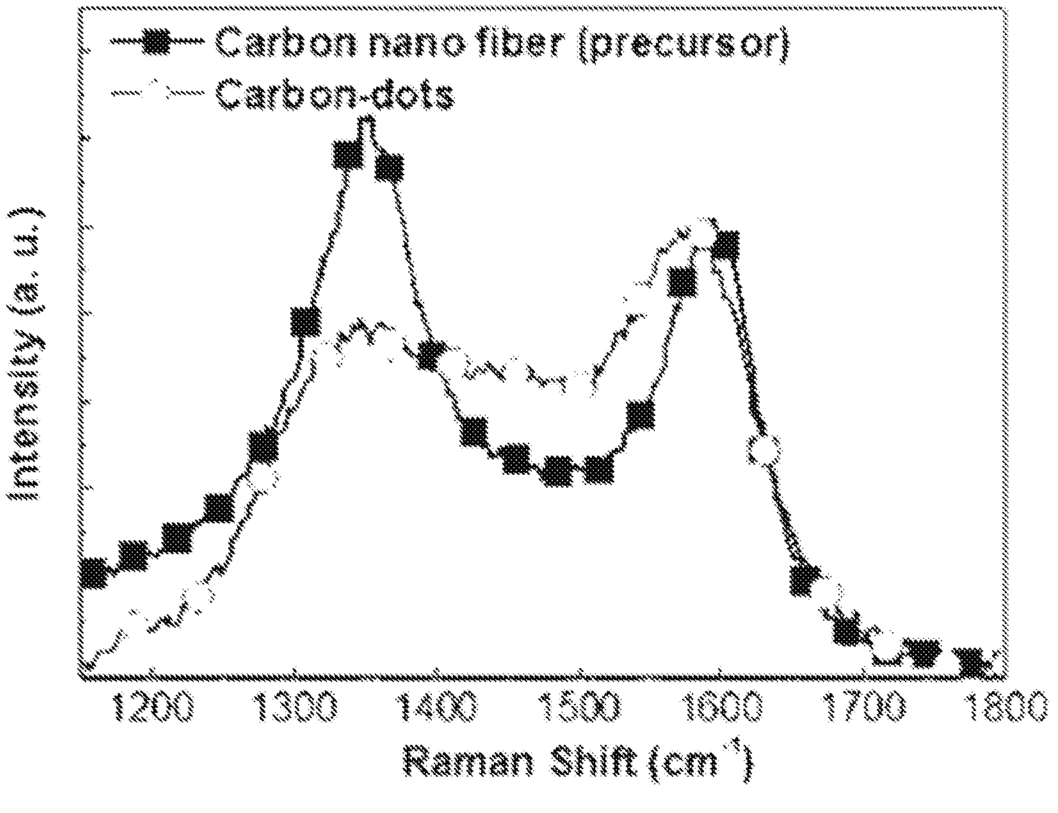
FIG. 4 (*a*) is Raman spectra of carbon fiber as raw materials of the carbon quantum dot ionic compound and carbon quantum dots electrolyte prepared according to the present invention, and FIG. 4(*b*) FT-IR spectrum of Li-carbon quantum dot ionic compound.
Figure 4B:
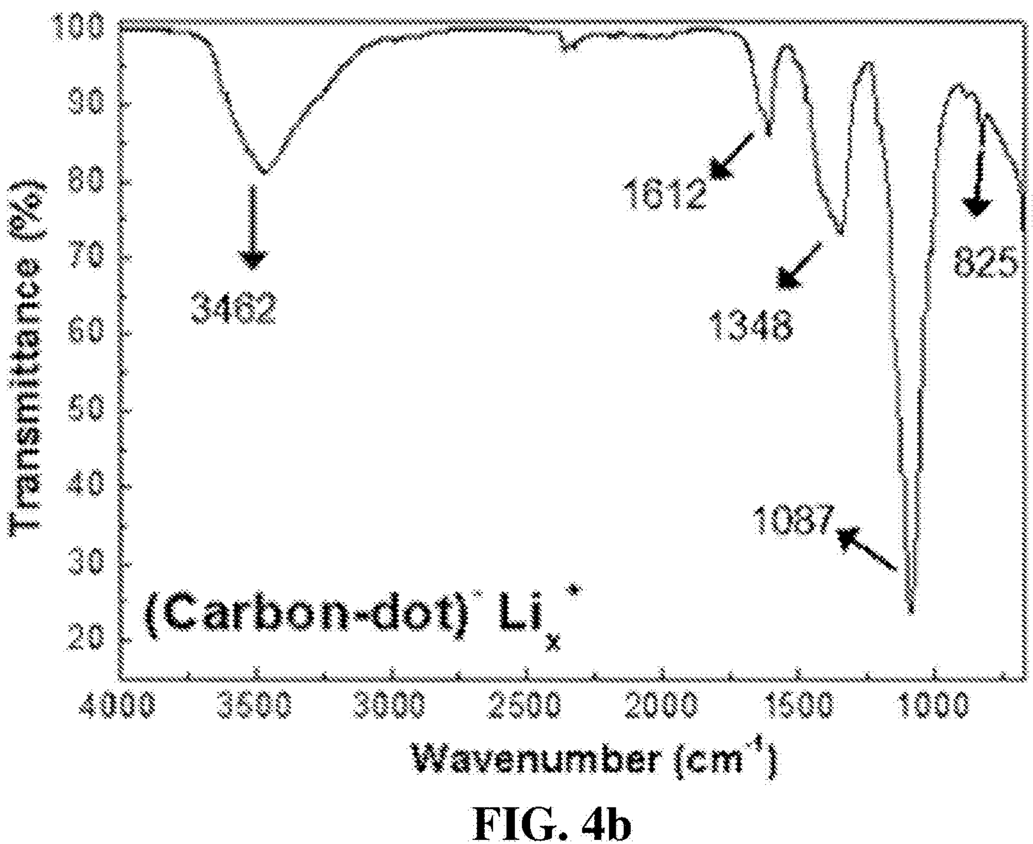

FIG. 4 (*a*) is a Raman spectrum of carbon fiber and carbon quantum dots which are raw materials of the carbon quantum dot ionic compound electrolyte prepared according to the present invention, and (b) is the FT-IR spectrum of the Li-carbon quantum dot ionic compound. As can be seen in FIG. 4 (*a*), the disordered graphitic lattice D1 (approximately 1350 $cm^{-1}$) band, which was strong in carbon fiber, was reduced in the carbon quantum dot ionic compound and instead the intensity of the amorphous carbon band D3 (approximately 1500 $cm^{-1}$) was increased. As shown in FIG. 4 (*b*), C—H deformation (825 $cm^{-1}$), C—O stretching (1100, 1340 $cm^{-1}$), C═C aromatic stretching (1612 $cm^{-1}$), C═O stretching (1797 $cm^{-1}$) and O—H bending (3462 $cm^{-1}$), etc. can be observed, it can be seen that the structure of the carbon quantum dot or carbon quantum dot ionic compound prepared according to the present invention has a structure as shown in FIG. 1 or 2.

Figure 5:
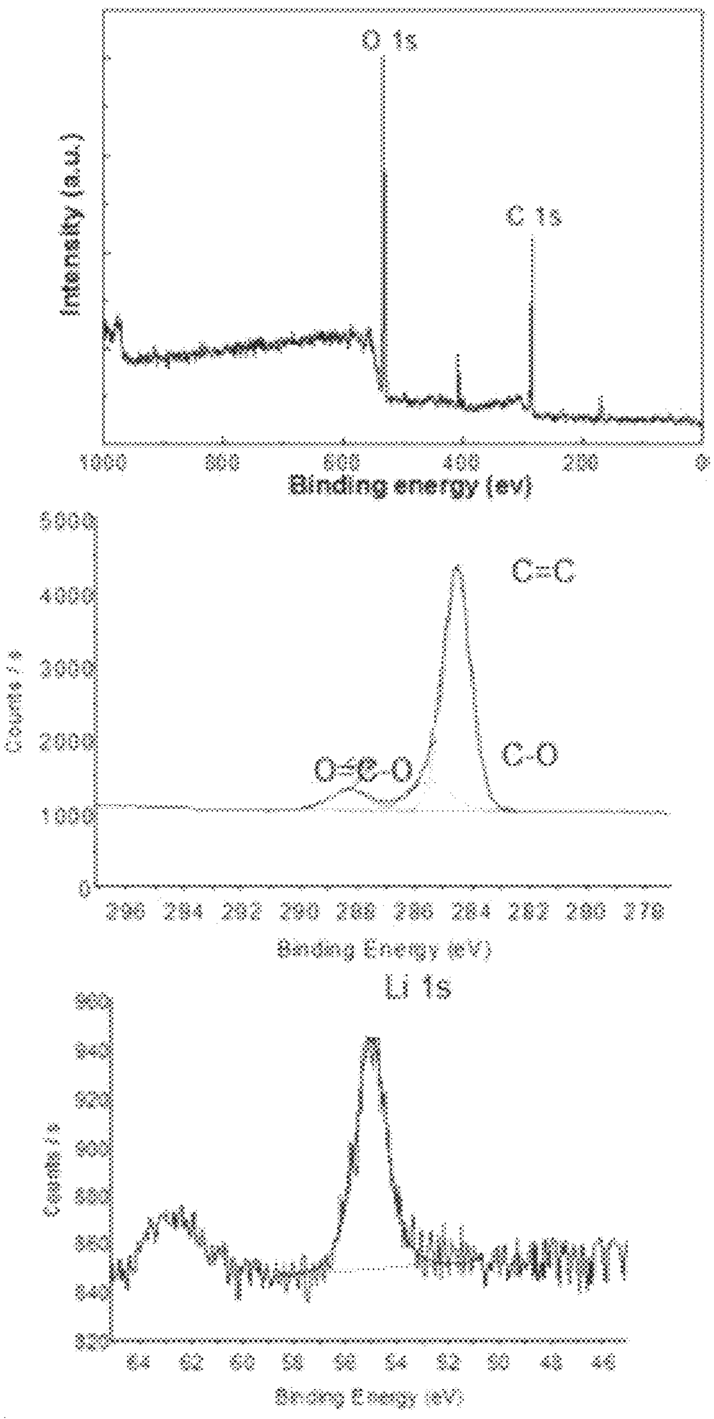
FIG. 5 is an X-ray photoelectron spectroscopy (XPS) result of a lithium ion compound among carbon quantum dot ionic compounds prepared in Example 1 according to the present invention.

FIG. 5 is an X-ray photoelectron spectroscopy (XPS) result of a lithium ion compound among carbon quantum dot ionic compounds prepared in Example 1 of the present invention. As can be seen in FIG. 5, the carbon quantum dot ionic compound prepared in the present invention was composed of carbon and oxygen and could confirm O═C—O, C—O and C═C bond.

Figure 6:
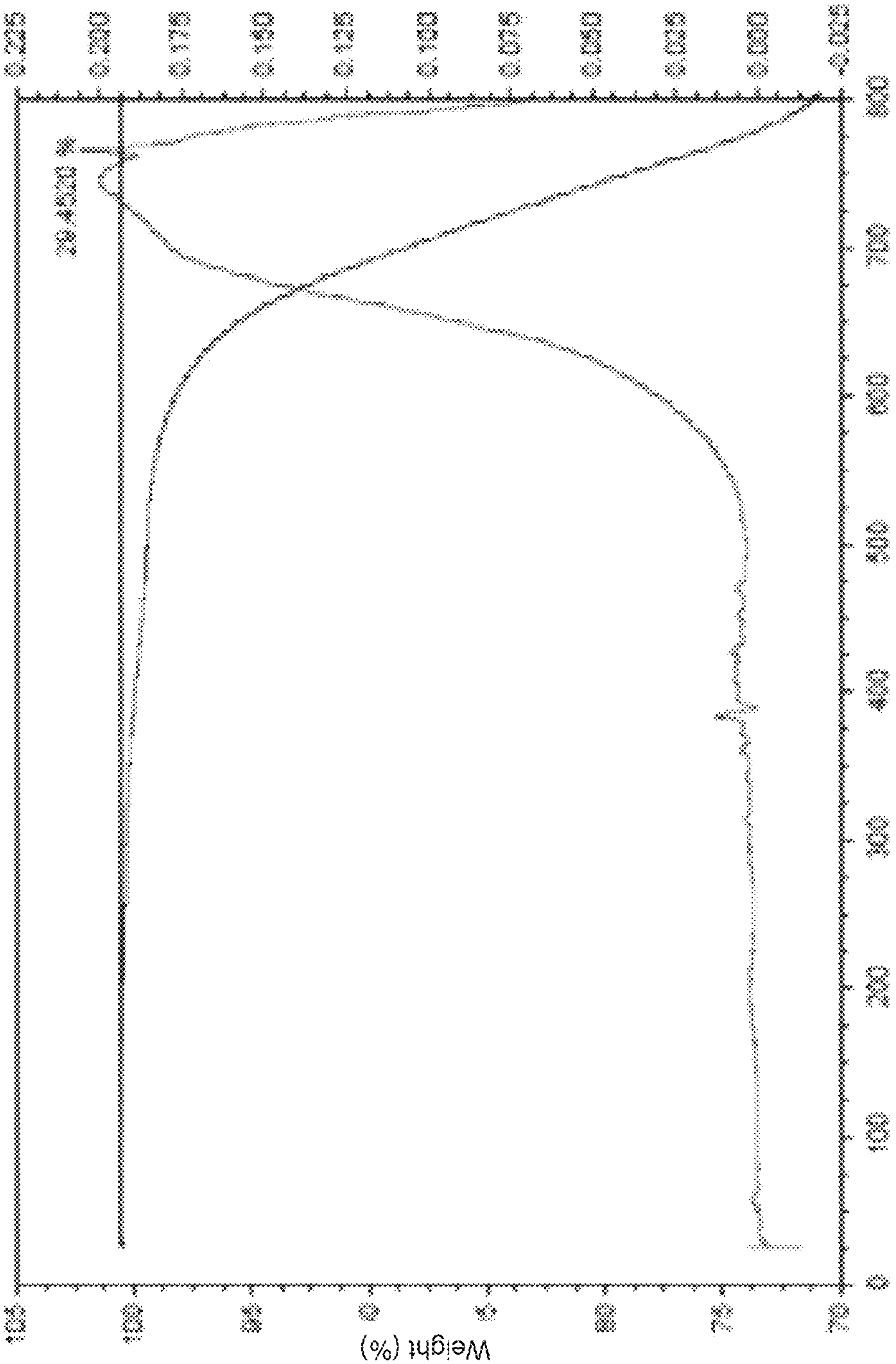
FIG. 6 is a thermal analysis result of the carbon quantum dot ionic compound prepared in Example 1 according to the present invention.

In addition, FIG. 6 is a thermal analysis of the carbon quantum dot ionic compound powder obtained in the embodiment of the present invention. As shown in FIG. 6, seeing that decomposition starts at a temperature of about 600° C. or more, the thermal stability of the carbon quantum dot ionic compound electrolyte according to the invention is very excellent.

In the following examples, among the carbon quantum dots prepared in Example 1, a carbon quantum dot ionic compound prepared with a carbon quantum dot having a size of 5.5 nm was used. Carbon quantum dot anion-potassium cationic electrolyte was applied to electrochromic device, carbon quantum dot anion-sodium cation was applied to electrochemical light emitting device, and carbon quantum dot anion-lithium cation was applied to lithium secondary battery system.

Example 2 (Production of Electrochromic Device Applying Carbon Quantum Dot Electrolyte)

Figure 7A:
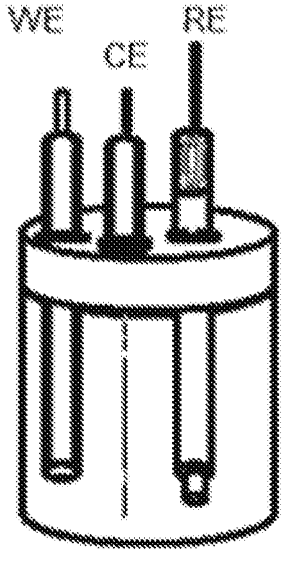
FIG. 7 (*a*) shows a structure diagram of a three-electrode electrochemical cell composed of a first electrode (working electrode), a platinum (Pt) second electrode (relative electrode) and reference electrodes (Ag/AgCl) and containing a color change material in an aqueous solution containing a carbon quantum dot ionic compound in Example 1 of the present invention, and FIG. 7(*b*) shows the results of cyclic voltammograms according to the concentration of ferricyanide.
Figure 7B:
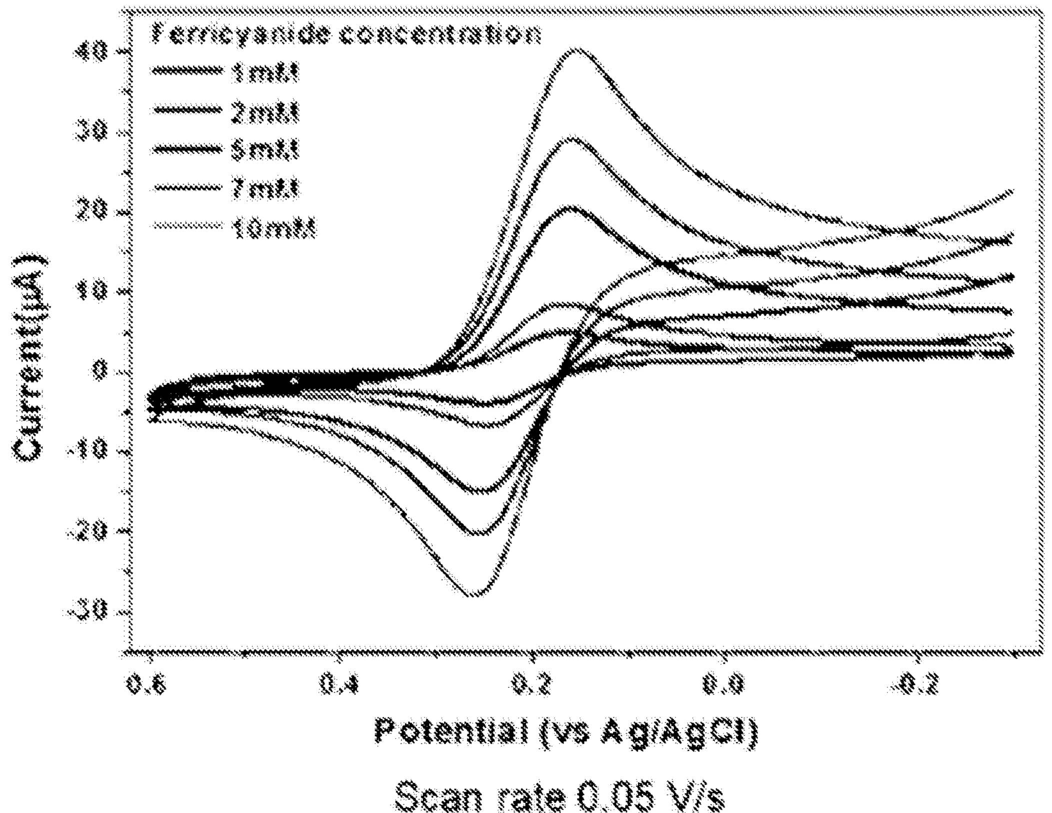
Figure 8:
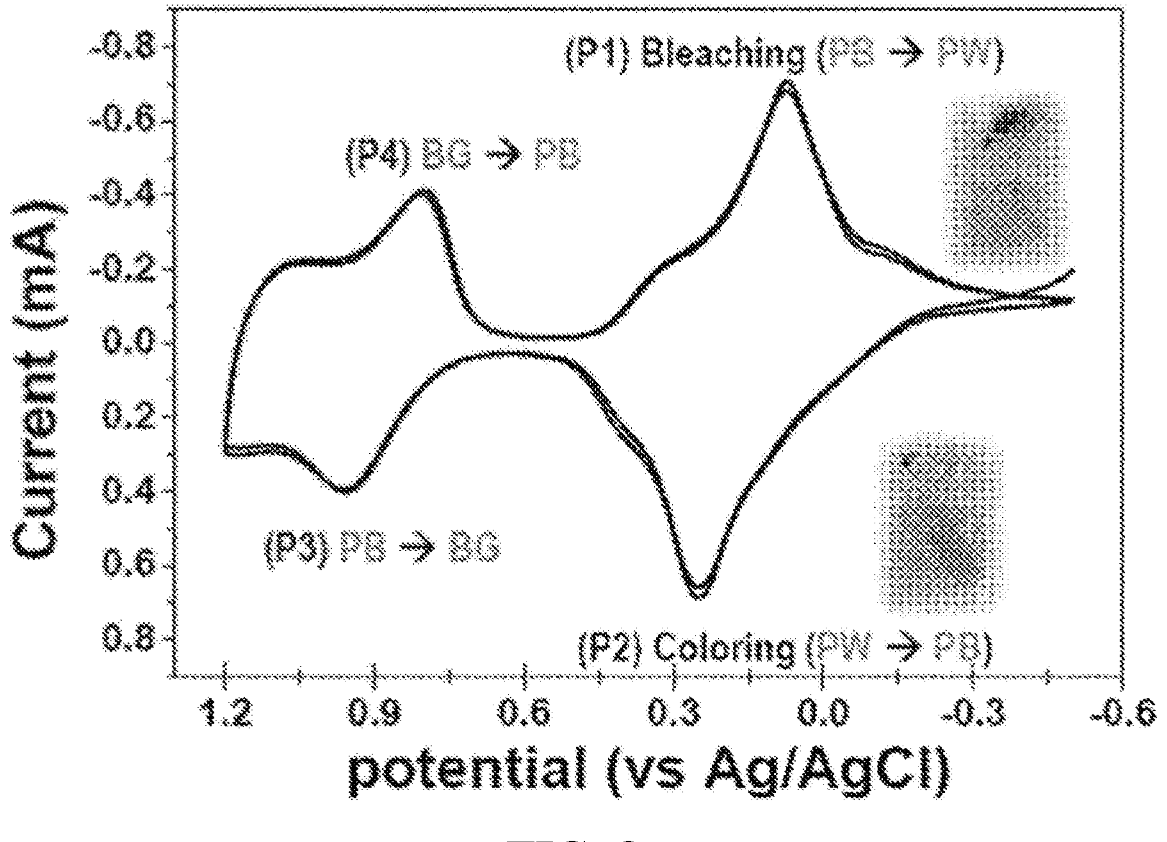
FIG. 8 shows the results of performing cyclic voltammetry (CV) at a scan rate of 0.02 V/s using the three-electrode system shown in FIG. 7(*a*).

FIG. 7 (*a*) shows a structure diagram of a three-electrode electrochemical cell composed of a first electrode (working electrode), a platinum (Pt) second electrode (relative electrode) and reference electrodes (Ag/AgCl) and containing a color change material in an aqueous solution containing a carbon quantum dot ionic compound in Example 1 of the present invention, and (b) shows the results of cyclic voltammograms according to the concentration of ferricyanide and FIG. 8 shows the results of performing cyclic voltammetry (CV) at a scan rate of 0.02 V/s using the three-electrode system shown in FIG. 7(*a*). Specific experimental conditions of the above experiment are as follows. First, a color change material layer is formed on a conductive transparent substrate as the first electrode by immersing the substrate in an aqueous solution containing 0.05 M HCl, 0.05 M $K_3Fe(CN)_6$, and 0.05 M $FeCl_3 \cdot 6H_2O$. The thickness of the color change material layer can be regulated by controlling the current and time using chronopotentiometry. In the present invention, the color change material was formed on the first electrode (working electrode) with 40 uA and 140 s. On the other hand, ZnO buffer layer was formed by immersing another conductive transparent substrate in 5 mM $ZnCl_2$, 0.1 M KCl, and an oxygen-saturated aqueous solution for 1000 s while applying −1 V at room temperature. Subsequently, the ZnO buffer layered transparent electrode was immersed in 0.5 mM $ZnCl_2$, 0.1 M KCl, and saturated oxygen solution at 80° C. for 1000 s while applying −1 V, and then ZnO NW (nanowire)s layer was formed thereon, which was used as a second electrode (relative electrode). The first electrode (working electrode) and the second electrode (relative electrode) were attached on the inside of the electrochromic devices in the form of a sandwich using a thermal tape with the distance of 60 um between the two electrodes. Subsequently, through the fine holes formed in the second electrode, 0.5M solutions of carbon quantum dot ionic compound of with respective Li, Na, and K were injected into the corresponding electrochromic device. The pH of the aqueous electrolyte solutions were adjusted to 4, respectively.

Comparative Example 1 (Manufacture of Electrochromic Device Including Potassium Chloride Electrolyte)

An electrochromic device was manufactured in the same manner as in Example 1, except that 0.5 M potassium chloride (KCl) was used as the electrolyte.

Figure 9:
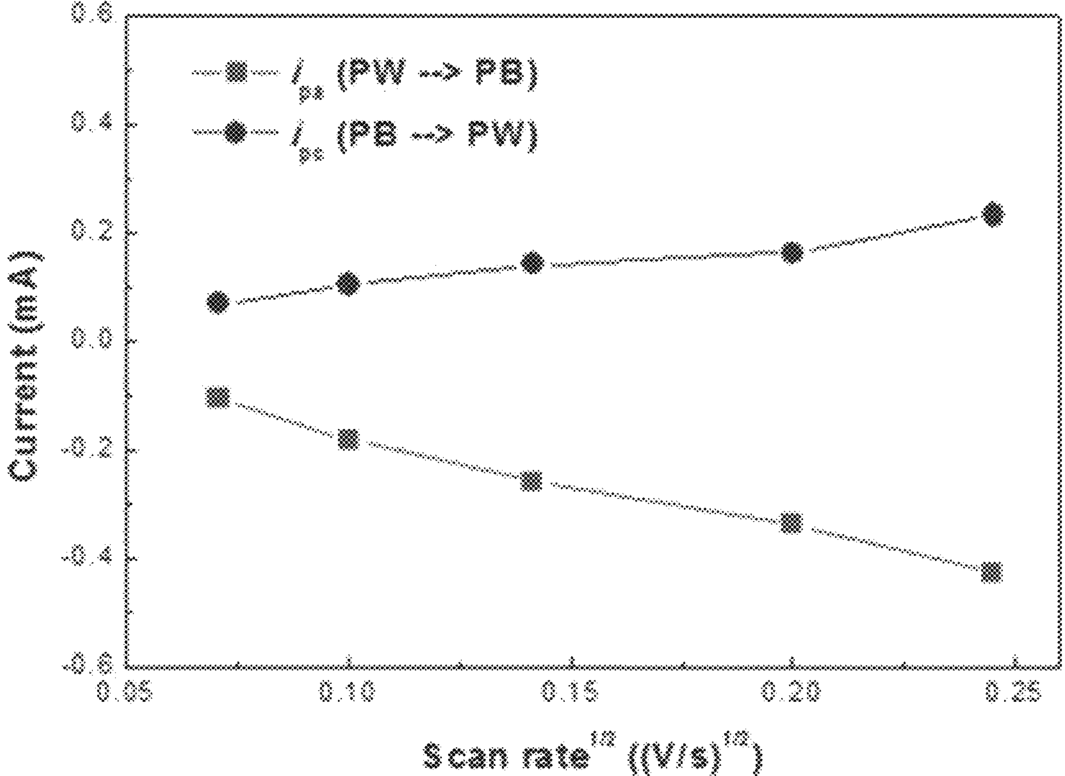
FIG. 9 is a result of measuring the oxidation/reduction current value of a discoloration material according to a scanning speed with a three-electrode system condition according to an embodiment of the present invention.

Electrochemical properties of the electrochromic devices prepared in Example 2 and Comparative Example 1 were compared. FIG. 8 shows the results of performing cyclic voltammetry (CV) at a scan rate of 0.02 V/s using the three-electrode including a first electrode, a platinum (Pt) second electrode, and a reference electrode (Ag/AgCl) including a color change material in an aqueous solution containing a carbon quantum dot ionic compound according to the present invention. And the characteristics of the electrochromic device were analyzed by applying voltage at −0.14/0.4 V and 10 s/10 s (50% duty cycle) using a chronoamperometry method. FIG. 9 is a result of measuring the oxidation/reduction current value of a color change material according to a scanning speed with a three-electrode system condition according to an embodiment of the present invention. Oxidative current is a coloration reaction (PB) and the reductive current is a decoloration reaction (PW). Table 1 below shows the diffusion rate values according to the metal cations of the carbon quantum dot ionic compound under the three-electrode system conditions.

TABLE 1

| | | 0.5M KCl | 0.5M $K^+$-C-dots$^-$ | 0.5M $Na^+$-C-dots$^-$ | 0.5M $Li^+$-C-dots$^-$ |
|---|---|---|---|---|---|
| diffusion rate | PB → PW | $2.7 \times 10^{-10}$ | $7.7 \times 10^{-11}$ | $2.0 \times 10^{-10}$ | $1.8 \times 10^{-12}$ |
| $D_o$ ($cm^2$/s) | PW → PB | $7.8 \times 10^{-10}$ | $3.3 \times 10^{-10}$ | $6.8 \times 10^{-10}$ | $3.4 \times 10^{-11}$ |

Figure 10:
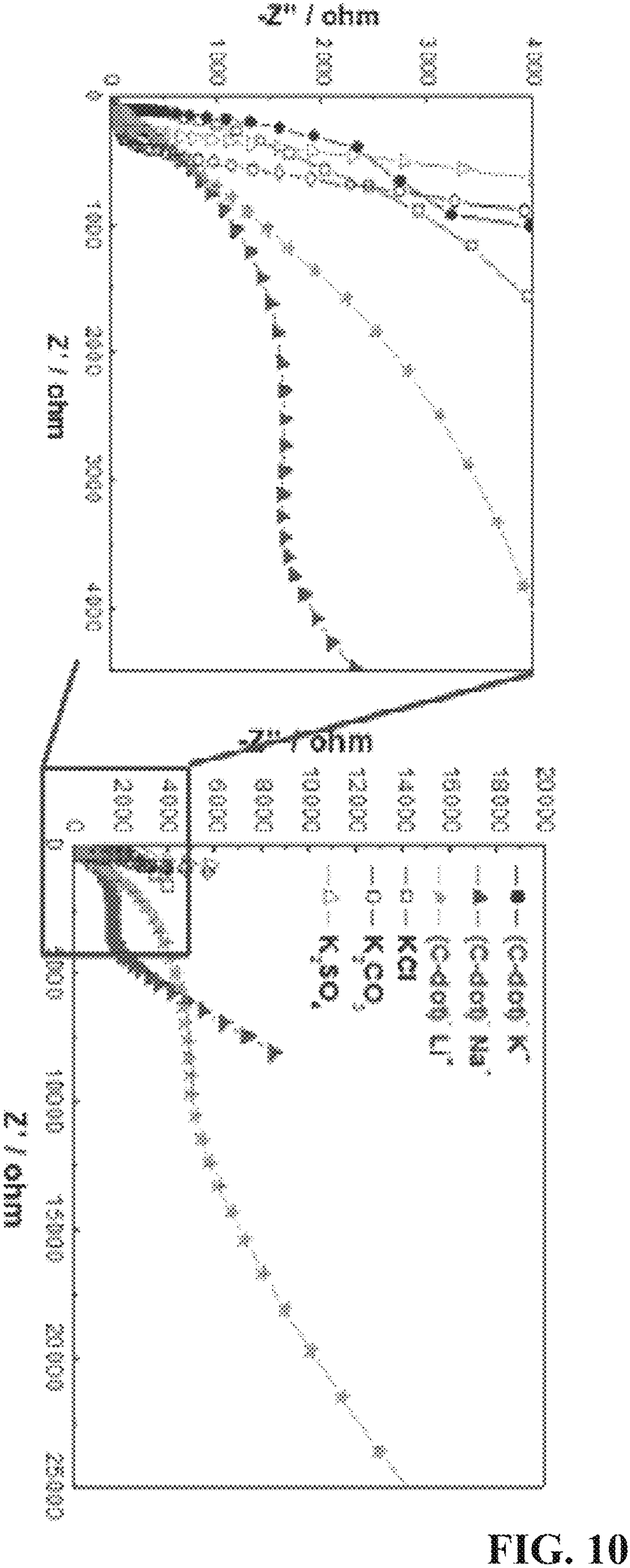
FIG. 10 is an electrochemical impedance spectroscopy of the electrochemical devices of Example 2 and Comparative Example 1 measured by changing metal cations in carbon quantum dot ionic compounds using three electrode system shown in FIG. 7(*a*).

FIG. 10 is an electrochemical impedance spectroscopy of the electrochemical devices of Example 2 and Comparative Example 1 measured by changing metal cations in carbon quantum dot ionic compounds using three electrode system, and Table 2 summarizes the measured impedance measurements with coloration reaction (PB) and the reductive current is a decoloration reaction (PW) using the circulating current voltage method in the three-electrode system.

TABLE 2

| | | 0.5M KCl | 0.5M $K^+$-C-dots$^-$ | 0.5M $Na^+$-C-dots$^-$ | 0.5M $Li^+$-C-dots$^-$ |
|---|---|---|---|---|---|
| $D^o$ ($cm^2$/s) | PB → PW | $2.7 \times 10^{-10}$ | $7.7 \times 10^{-11}$ | $2.0 \times 10^{-10}$ | $1.8 \times 10^{-12}$ |
| | PW → PB | $7.8 \times 10^{-10}$ | $3.3 \times 10^{-10}$ | $6.8 \times 10^{-10}$ | $3.4 \times 10^{-11}$ |
| PB → PW | $R_s$ (W) | 34 | 34 | 45 | 71 |

TABLE 2-continued

| | | 0.5M KCl | 0.5M $K^+$-C-dots$^-$ | 0.5M $Na^+$-C-dots$^-$ | 0.5M $Li^+$-C-dots$^-$ |
|---|---|---|---|---|---|
| Intercalation | $R_{ct}$ (W) | 62 | 52 | 285 | 359 |
| PW → PB | $R_s$ (W) | 33 | 35 | 45 | 72 |
| Detercalation | $R_{ct}$ (W) | 80 | 53 | 1585 | 4949 |

Figure 11A:
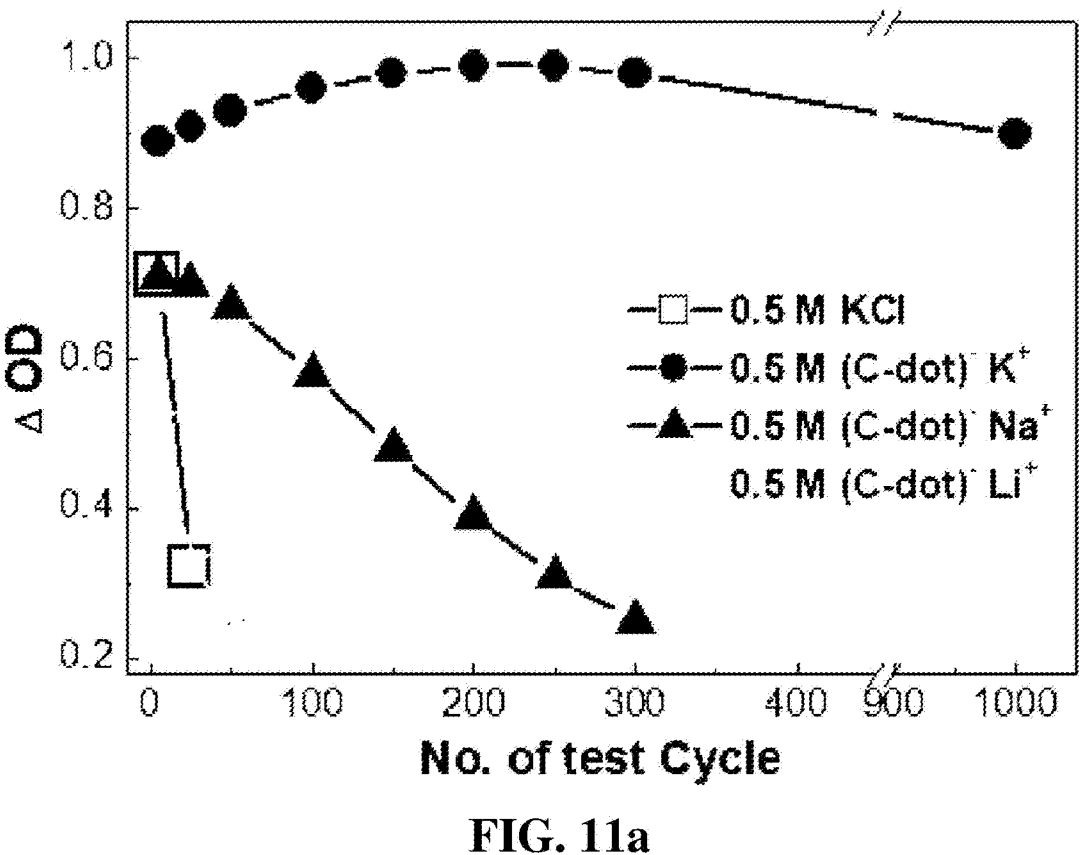
FIGS. 11(*a*)-11(*b*) show the measurement of lifespan of the electrochromic device using a three-electrode system in one embodiment according to the present invention with changing the type of electrolyte applied under the conditions and measuring the transmittance using 700 nm light.
Figure 11B:
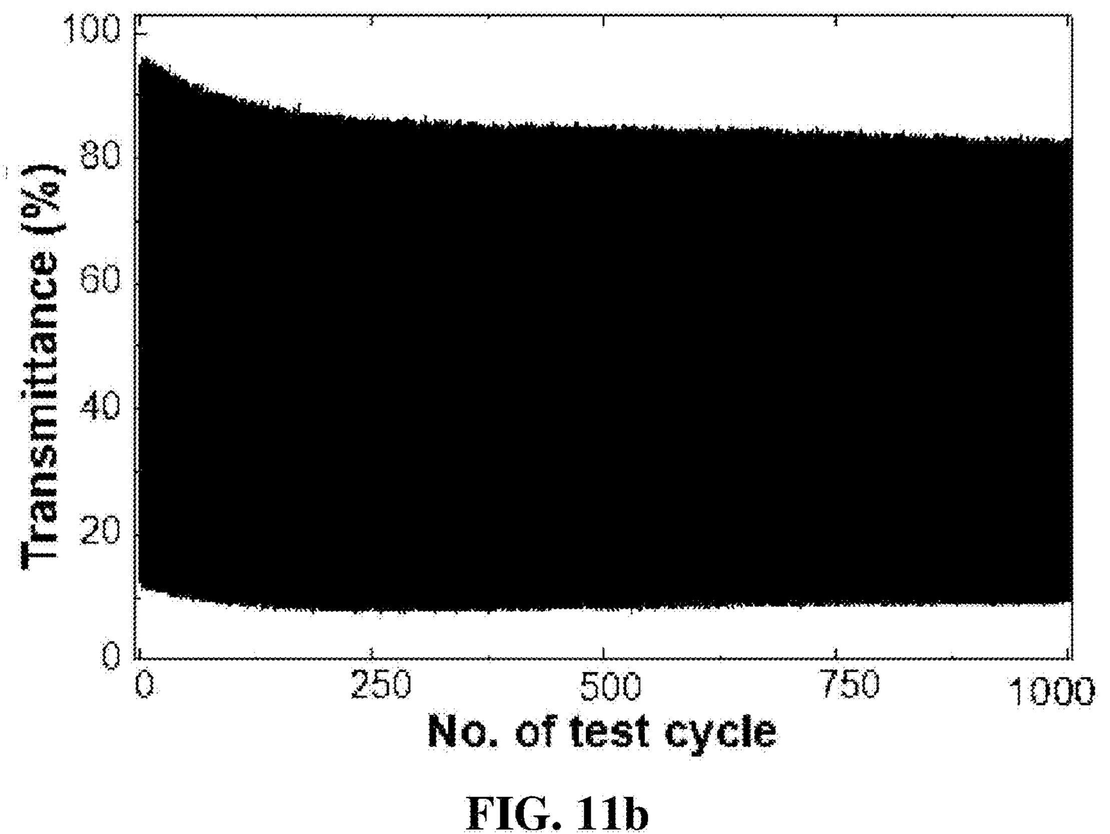

The durability of the electrochromic devices prepared in Example 2 and Comparative Example 1 was tested. FIG. 11 shows the test result of electrolyte durability of an electrochromic device, which is an example of electrochemical devices manufactured in Examples and Comparative Examples according to the present invention. As can be seen in FIG. 11, it can be seen that color change efficiency maintained constant even after 1000 cycles in the electrochromic device using a electrolyte, (C-dot)$^-$K$^+$, according to the present invention, whereas the color change efficiency is reduced to less than the initial half level within 50 cycles in the electrochromic device using a conventional KCl electrolyte. This means that the electrochromic device using the (C-dot)$^-$K$^+$ electrolyte has excellent durability. Specifically, it can be concluded that (1) the (C-dot)$^-$K$^+$ ionic compound serves as an electrolyte, (2) the electrochemical durability of the (C-dot)$^-$K$^+$ electrolyte is excellent, and (3) less electrochemical side reactions are induced in device. Coloration efficiency (CE) is determined by the change in absorbance from the amount of charge required for a chromogenic or discolored state ($\Delta OD$ ($\lambda$)=log $T_b/T_c$, $T_b$ and $T_c$ means transmittance at 700 nm). The discoloration efficiency values of 0.5 M KCl and (C-dot)$^-$K$^+$ electrolyte were 81.6 cm$^2$/C and 103.0 cm$^2$/C, respectively. Therefore, it can be concluded that electrochromic devices using a carbon quantum dot ionic compounds are relatively superior in electrochromic stability and discoloration efficiency than that using KCl electrolyte. Table 3 summarizes the changes in absorbance and so forth.

TABLE 3

| | $\Delta$OD log($T_b/T_c$) | $\eta$ (cm$^2$/C) ($\Delta$OD/$\Delta$Q) | $\Delta$T (%) ($\lambda$ = 700 nm) | $t_b$ (s) | $t_c$ (c) | $\Delta T_{200\ cycle}$ (%) | $\Delta T_{300\ cycle}$ (%) |
|---|---|---|---|---|---|---|---|
| 0.5M KCl | 0.71 | 81.6 | 67 | 1.9 | 3.0 | — | — |
| 1.0M KCl | 0.96 | 110.5 | 92 | 1.7 | 2.5 | 5 | — |
| 0.5M $K^+$-C-dots$^-$ | 0.89 | 103.0 | 85 | 1.6 | 2.8 | 99 | 98 |
| 0.5M $Na^+$-C-dots$^-$ | 0.71 | 84.0 | 66 | 2.4 | 2.6 | 39 | — |
| 0.5M $Li^+$-C-dots$^-$ | 0.52 | 78.7 | — | — | — | — | — |

As can be seen in FIG. 11 and Table 3, the carbon quantum anion-metal cation ion compound electrolyte of the present invention shows excellent performance as an electrolyte, and in particular, durability is much superior to a conventional electrolyte.

Example 3 (Electrochemical Light Emitting Device)

An electrochemical light emitting device was prepared ad follows;

(1) Forming a thin film of $TiO_2$ particles on the surface of the cathode.

(2) Performing heat treatment on the $TiO_2$ thin film coated cathode at 120° C. for 10 minutes in order to increase the conductivity and transmittance.

(3) Immersing the cathode in which the $TiO_2$ thin film was formed in an emitting material solution for 55° C. for 6 hours.

(4) After 6 hours, washing the surface of the cathode with ethanol.

(5) Attaching the cathode and anode inside the device using a thermal tape respectively.

(6) Injecting solution containing the light-emitting material and the electrolyte through the hole formed in the anode.

(7) Sealing the hole.

Figure 12:
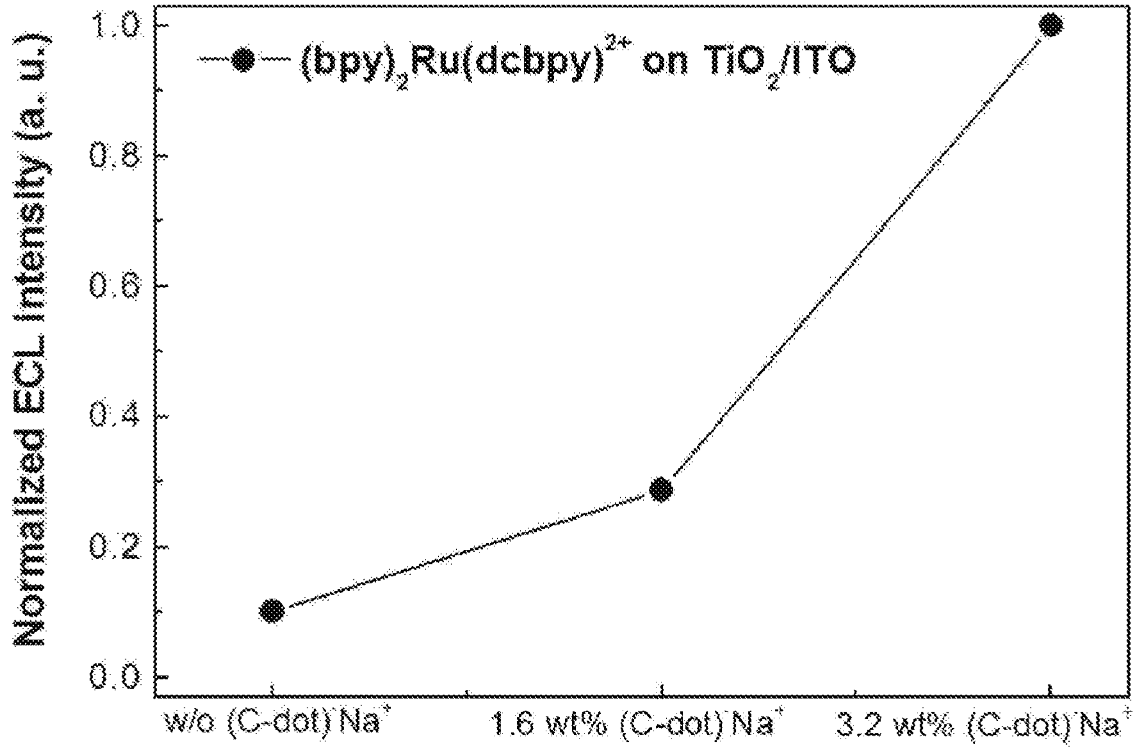
FIG. 12 shows a light emission intensity measurement result according to the carbon quantum dot ion compound concentration under the two-electrode system conditions for the electroluminescent device in one embodiment according to the present invention.

FIG. 12 shows a light emission intensity measurement result according to the carbon quantum dot ion compound concentration under the two-electrode system conditions for the electroluminescent device in one embodiment according to the present invention. As can be seen in FIG. 12, as the carbon quantum point anion-metal cation ion compound concentration is increased, the ionic conductivity is improved, thereby reducing the resistance in the device and eventually increasing the luminescence intensity.

Example 4 (Lithium Secondary Battery)

Figure 13:
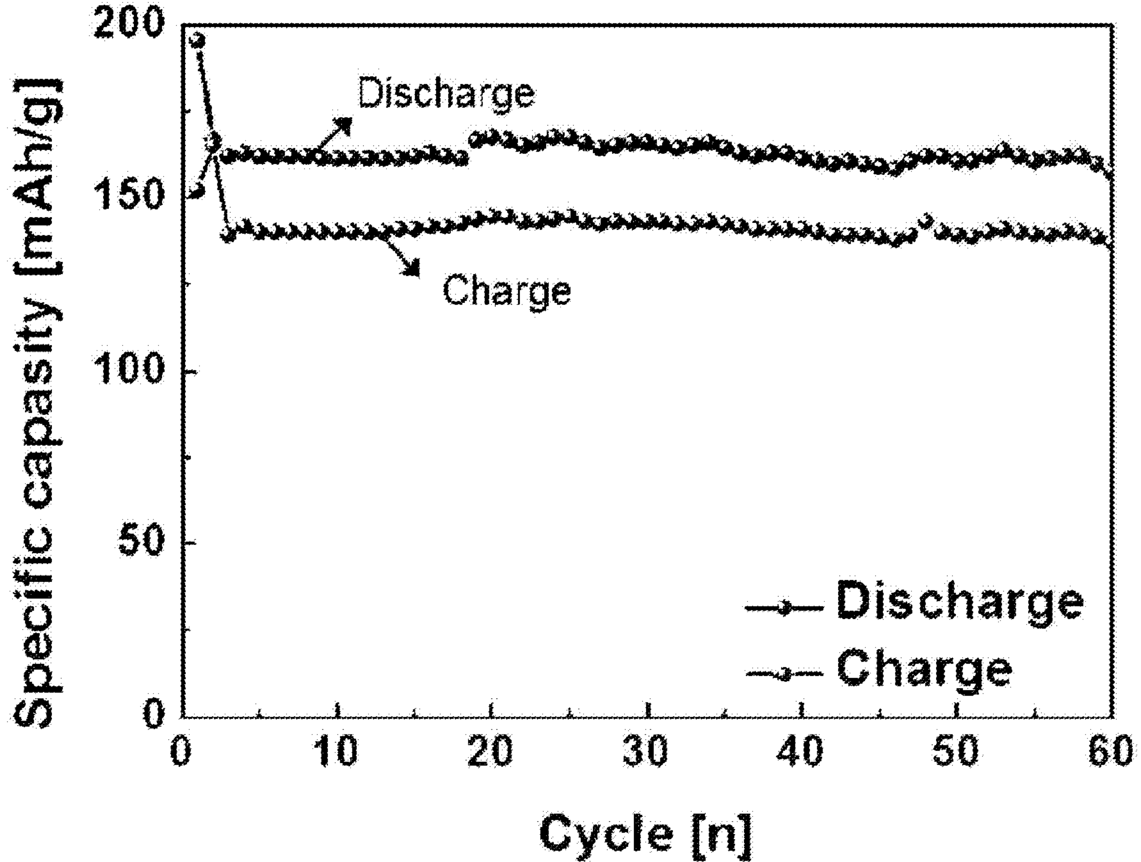
FIG. 13 shows charge/discharge test result of a lithium secondary battery applying a carbon quantum dot ion compound according to the present invention.
Figure 14A:
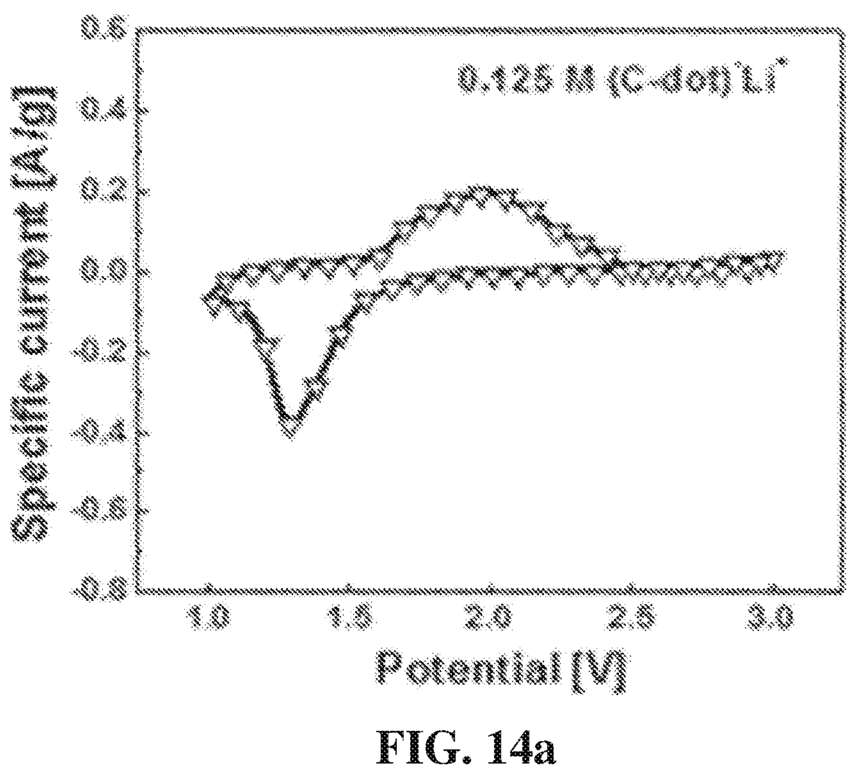
FIGS. 14(*a*)-14(*d*) show cyclic voltammetry measurements with varying the concentrations (0.125, 0.25 and 0.5M, respectively) of the carbon quantum dot anion-lithium cation ion compound electrolyte prepared according to the present invention.
Figure 14B:
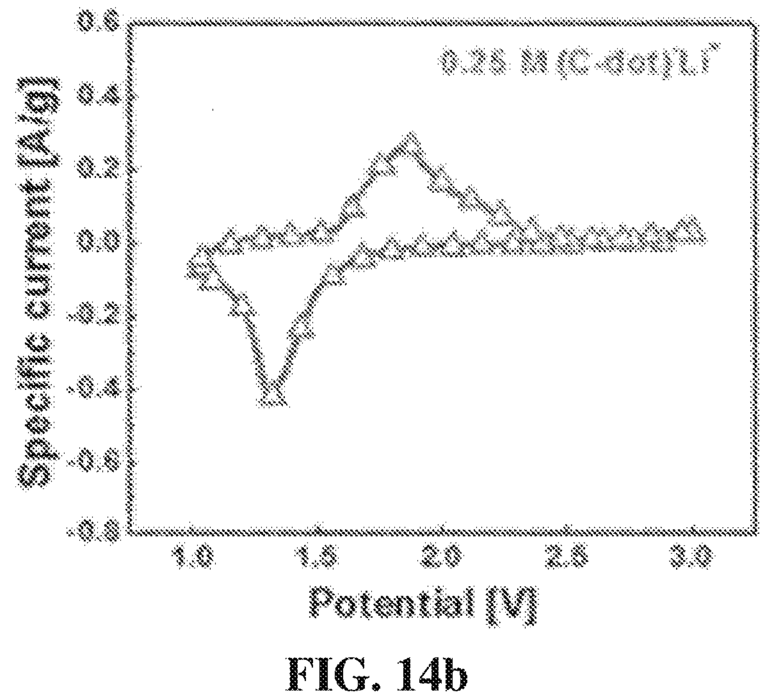
Figure 14C:
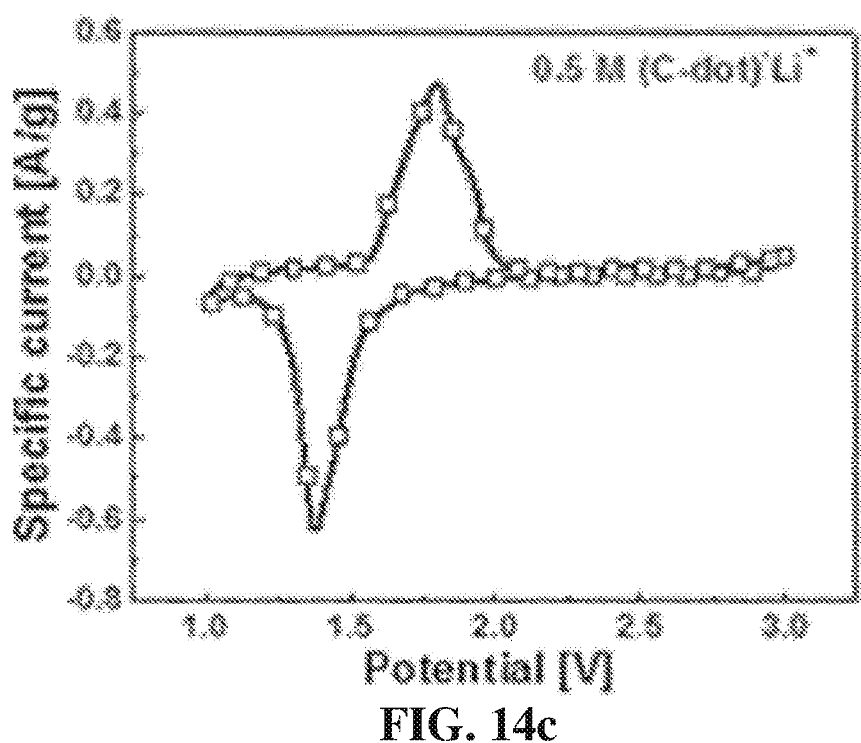
Figure 14D:
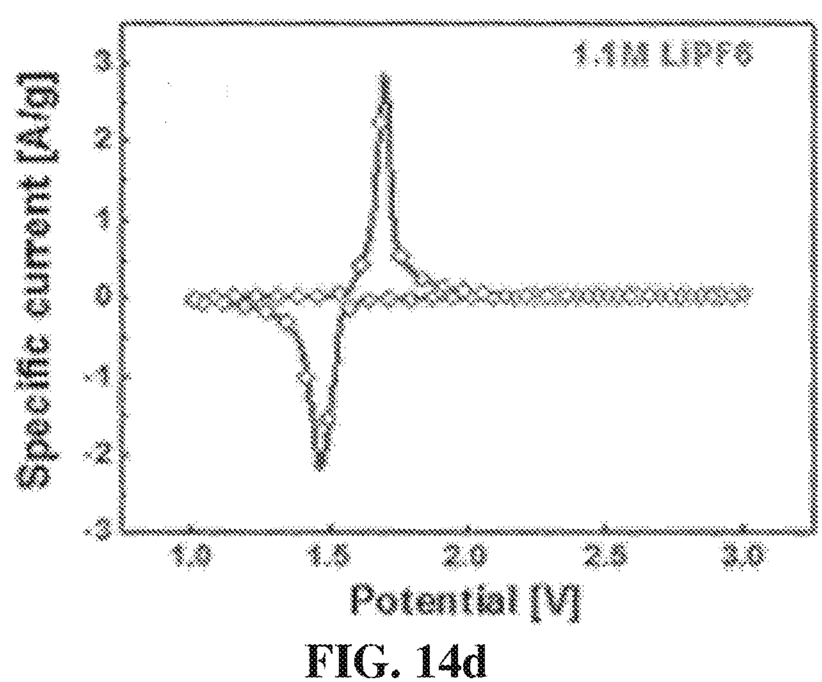

FIG. 13 shows the results of measuring the specific capacitance with charging and discharging the lithium secondary battery applying the carbon quantum anion-lithium metal cation ion compound electrolyte of the present invention instead of LiPF6 electrolyte of the conventional secondary battery. The anode of the battery was constructed using $Li_4Ti_5O_{12}$ (active material, LTO), 10 wt. % PVDF (binder) and NMP (Solvent), and the cathode was graphite. The concentration of the carbon quantum point anion-lithium metal cation ion compound electrolyte was 0.5M. As shown in FIG. 13, it was found that a stable charge/discharge cycle is observed in the secondary battery.

Example 5 (Lithium Secondary Battery Electrolyte Evaluation)

In order to check the characteristics of the electrolyte, various experiments were performed on the lithium ion battery of above Example 4. First, a cyclic voltammetry was performed with varying concentrations of an electrolyte applied to a lithium ion battery. FIGS. 14 (*a*) to 14 (c) show cyclic voltammetry measurements with varying the concentrations (0.125, 0.25 and 0.5M, respectively) of the carbon quantum dot anion-lithium cation ion compound electrolyte prepared according to the present invention. As shown in FIG. 14, the higher the electrolyte concentration (the higher the content) shows the same tendency as shown in the charge and discharge data, and it can be seen that the difference in electrochemical performance. Although that of 0.25M sample showed unstable in the anodic region from 2.5 V or higher, that of 0.5M sample, though it was slightly shifted from 1.6 V, which is the theoretical Li ion intercalation/deintercalation region of the LTO, shows distinct anodic/cathodic peaks. Table 4 below shows the results of measuring polarization according to each concentration.

TABLE 4

| | 0.125 | 0.25 | 0.5 |
|---|---|---|---|
| Polarization | 0.715 V | 0.542 V | 0.43 V |

Figure 15A:
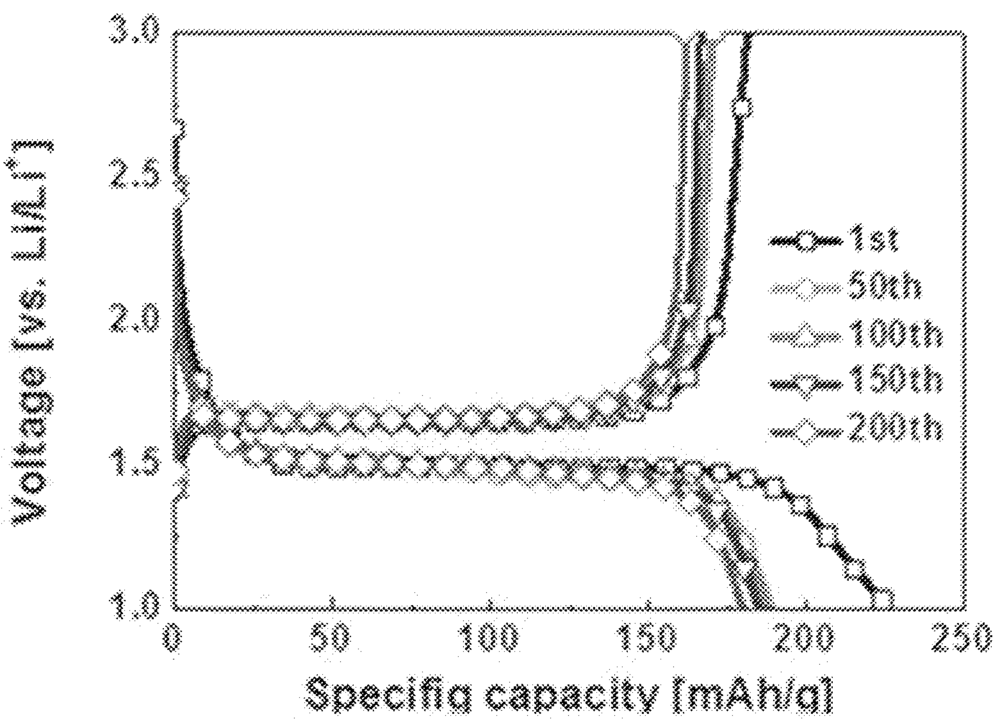
FIG. 15 (*a*) shows the results of cycling test under the condition of the current density of 160 mA/g in one embodiment of the present invention and FIG. 15 (*b*) the result of measuring the change of the current density by concentration.
Figure 15B:
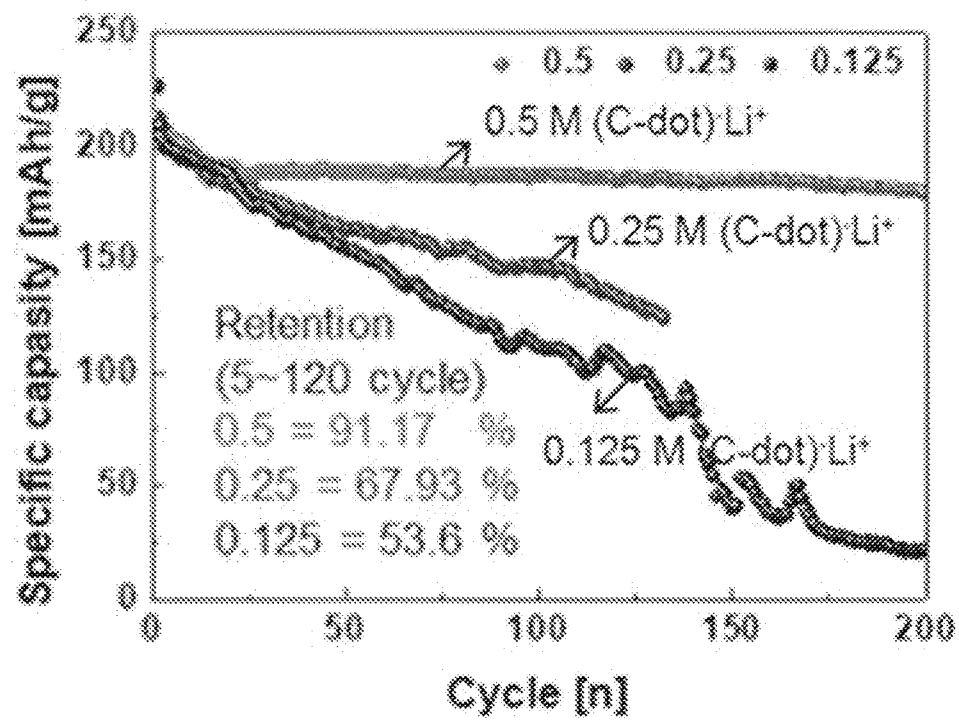

In order to determine the rate characteristic of the electrolyte according to each concentration, charge and discharge cycling was performed at various current densities of 80 to 400 mA/g, and the results are shown in FIG. 15. FIG. 15 (*a*) is the result of the 0.5M concentration electrolyte, (*b*) is the result of measuring the cycle for each concentration. As can be seen in FIG. 15, the rate characteristic of the relatively high concentration of 0.5M sample was the best. When calculating the average capacity for each current density, that of 0.5M sample is the best at all current density. The results were summarized in Table 5.

TABLE 5

| | 0.125 | 0.25 | 0.5 |
|---|---|---|---|
| 80 mA/g | 193.47 | 194.28 | 194.33 |
| 160 mA/g | 166.45 | 161.96 | 171.67 |
| 240 mA/g | 148.38 | 151.61 | 162 |
| 320 mA/g | 121.36 | 134.46 | 149.33 |
| 400 mA/g | 78.91 | 104.28 | 134.33 |

As can be seen from Table 5, in particular, when the current density of 320, 400 mA/g, the performance of each sample shows the largest difference, which is due to the concentration of the electrolyte, that is, the difference in the content of Li ions.

Figure 16A:
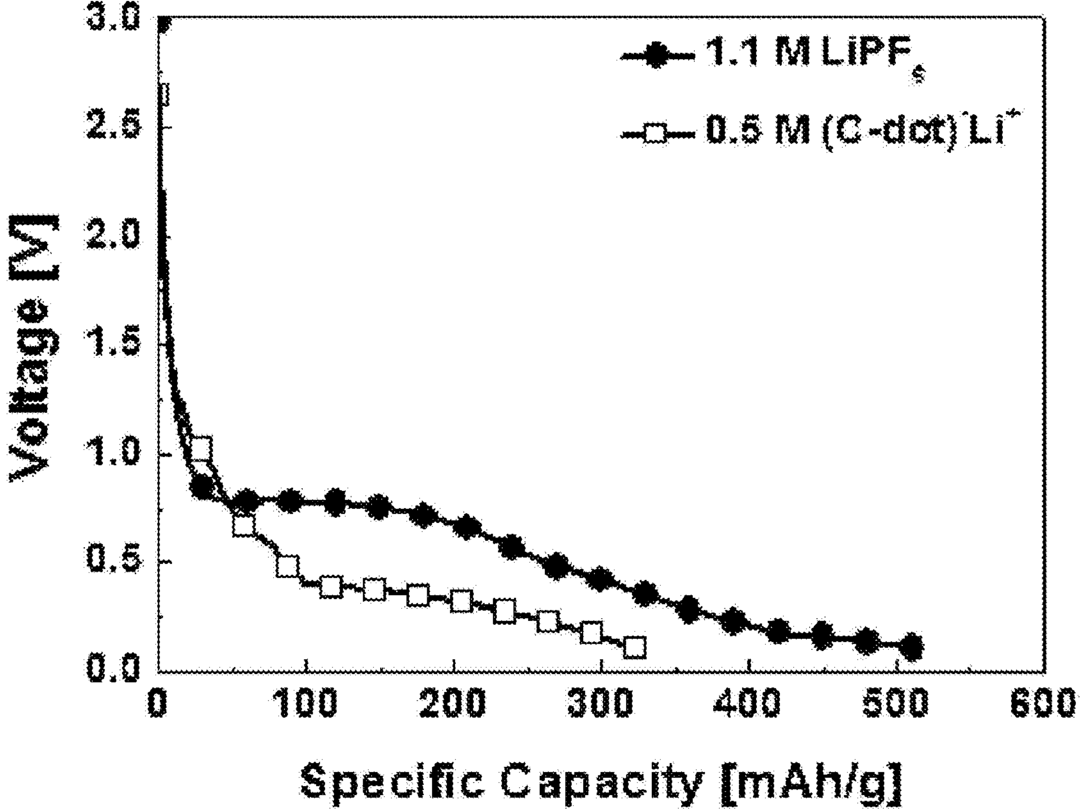
FIG. 16 (*a*) shows voltage-capacitance measurement results measured at an electrode of both lithium ion batteries applying a carbon quantum dot ion compound electrolyte and a LiPF6 electrolyte respectively in Example 5 of the present invention and FIG. 16(*b*) is differential result with respect to voltage.
Figure 16B:
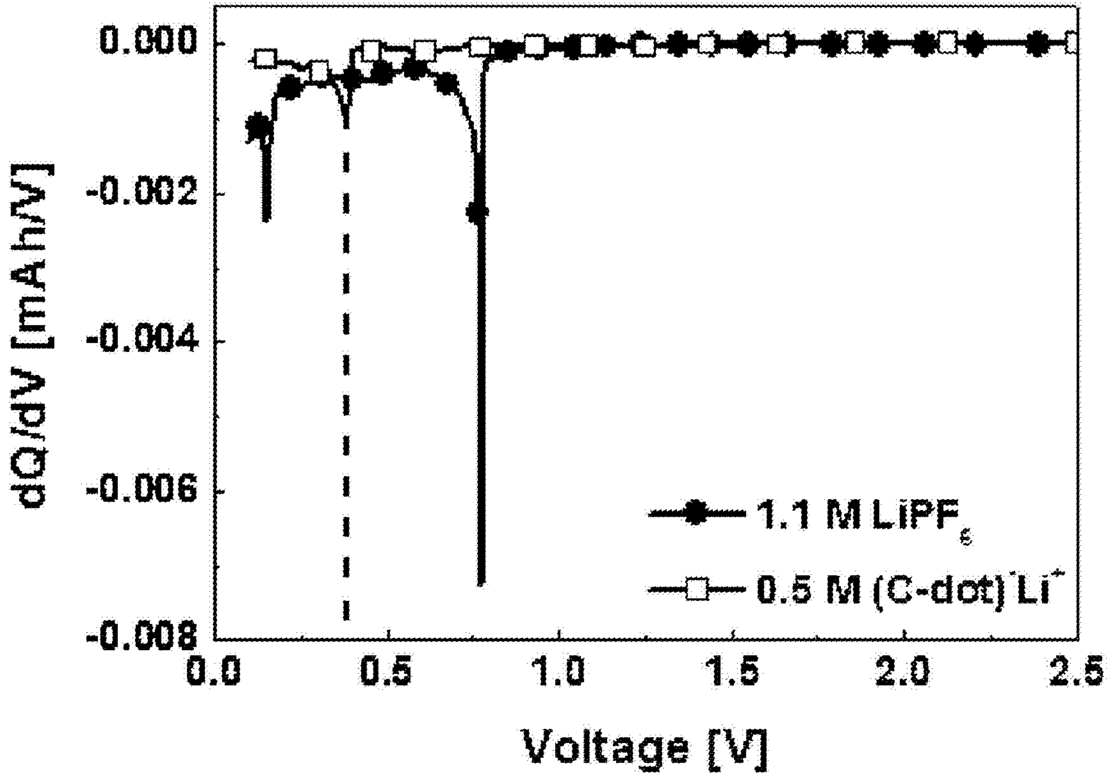

In addition, the specific capacity change of the Li metal (anode)/electrolyte/graphite (cathode) battery system was observed while changing the voltage after constructing the half cell system in the lithium ion battery of Example 4. For comparison, a lithium ion battery employing $LiPF_6$ as an electrolyte was prepared and the same observation was performed. FIG. 16 (*a*) shows voltage-capacitance measurement results measured at an electrode of both lithium ion batteries applying a carbon quantum dot ion compound electrolyte and a $LiPF_6$ electrolyte respectively in Example 5 of the present invention and (b) is differential result with respect to voltage. As shown in FIG. 16, when $LiPF_6$ was used as an electrolyte, a reaction estimated to form SEI was observed at 0.75 V, whereas when a carbon-dots electrolyte is used, a reaction at 0.75 V was not observed, but observed at 0.5 V estimated by reaction of graphite and Li.

The ion mobility of lithium ions was measured also. Equation 1 below is a formula for obtaining the ion mobility index of the cation. The equation is represented by a number from 0 to 1, and the closer to 1, the higher the contribution of charge transfer by cation.

$$t_C = \frac{I_C}{I_C + I_A} \quad \text{[Equation 1]}$$

Where $t_C$=Cation transference number, $I_C$=Current carried by cations, $I_A$=Current carried by anions Equation 1 may be expressed as Equation 2 below to measure the ion mobility index of Li ions.

$$t_{Li} = \frac{I_{SS}(V - I_O R_O)}{I_O(V - I_{SS} R_{SS})} \quad \text{[Equation 2]}$$

In equation 2, $t_{Li}$=Lithium transference number, V=Applied potential, $R_O$=Initial resistance of the passivation layer, $R_{SS}$=Resistance of the passivation layer, $I_O$=Initial current, $I_{SS}$=Steady state current.

Figure 17:
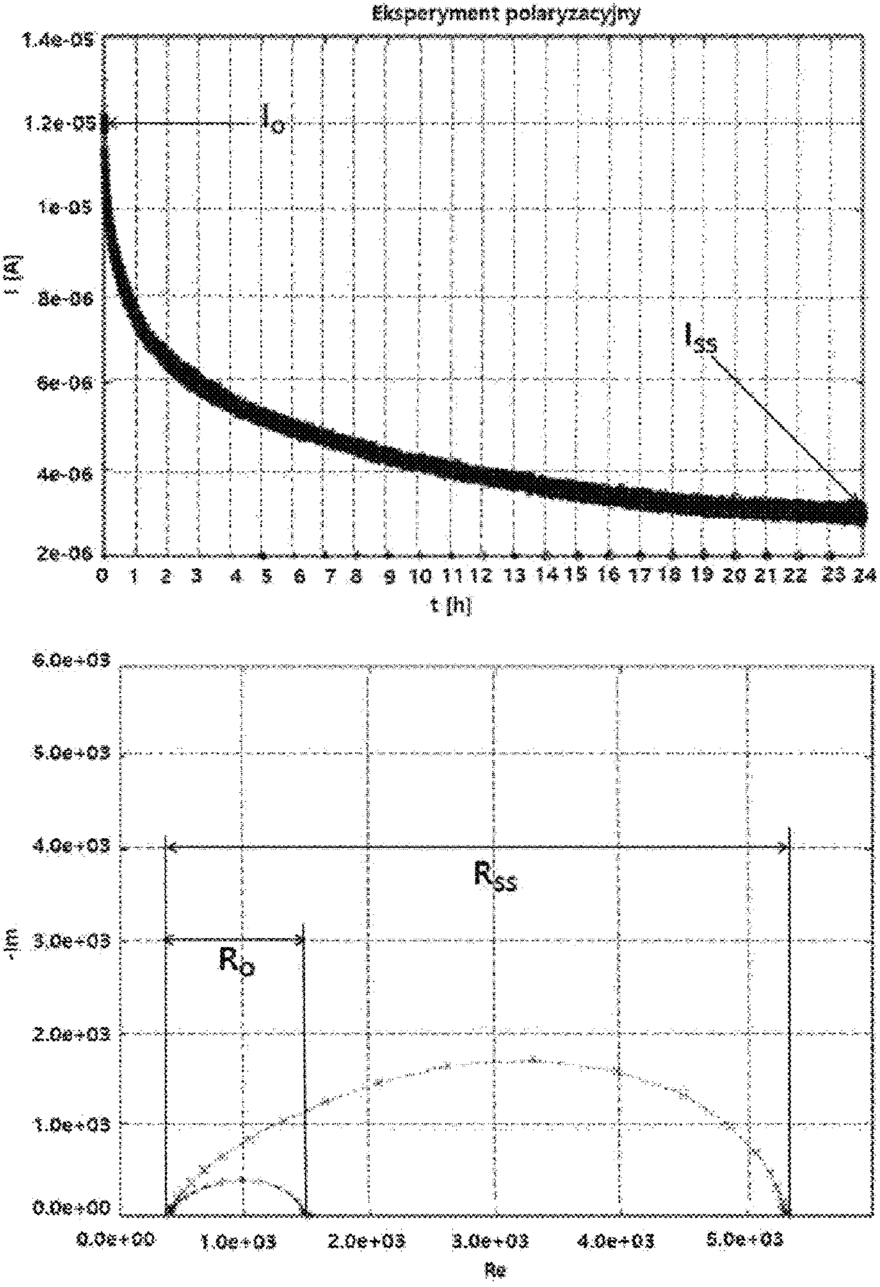
FIG. 17 shows the result of measuring I0 and Iss (top) and R0 and Rss (bottom) in order to calculate the charge transfer index of lithium ions in the lithium ion battery applying the electrolyte of the present invention.

A symmetrical cell of Li metal/electrolyte/Li metal was prepared, initial impedance $R_O$ was measured (frequency range: 100 kHz-0.1 Hz), DC polarization experiment was performed at 0.05 mV to measure $I_{SS}$, $I_O$, and the impedance was measured again to determine $R_{SS}$. And the result of that using $LiPF_6$ as the electrolyte in the same manner was measured as a comparative example. FIG. 17 and Table 6 summarize the results.

TABLE 6

| | (Carobon-dots)$^-$ $Li_x^+$ | $LiPF_6$ |
|---|---|---|
| $t_{Li}$ | 0.77 ± 0.1 | 0.44 |

As can be seen in FIG. 17 and Table 6, the carbon quantum dot anion-lithium cation ionic compound electrolyte of the present invention was found to be 1.5 to 2 times higher charge transfer index by the cation than $LiPF_6$. Considering that a smaller $t_{Li}$ increases the overall resistance of the cell due to concentration polarization of anions in the electrolyte and the cation yield may be affected by the temperature, the concentration of salt in the electrolyte and the radius of the ions, the high $t_{Li}$ of the electrolyte of the present invention is deemed to be caused by the large anion radius of the carbon dot.

Although the invention has been described with reference to specific exemplary embodiments, it is apparent for a person skilled in the art that various changes can be made and equivalents can be used as a replacement without departing from the scope of the invention. The invention should consequently not be restricted to the disclosed exemplary embodiments, but rather should enclose all the exemplary embodiments which fall into the scope of the enclosed claims. In particular, the invention also claims protection for the subject matter and the features of the subordinate claims independently of the claims referred to.

What is claimed is:

1. A liquid phase comprising:

at least one solvent selected from the group consisting of water, methanol, ethanol, dimethyl carbonate, and ethylene carbonate; and an electrolyte comprising a salt form consisting of:

(i) an alkali metal cation, and (ii) a carbon quantum dot anion in a form of graphite oxide having at least one oxygen anion on a surface thereof and having an average diameter in the range of 2 to 12 nanometers (nm) and a surface potential of −20 mV or less, wherein the electrolyte is dissolved in the at least one solvent.

2. The liquid phase according to claim 1, wherein the alkali metal cation is based on an alkali metal of at least one selected from the group consisting of Li, Na, K, and Cs.

3. The liquid phase of claim 1, wherein the salt has a structure of

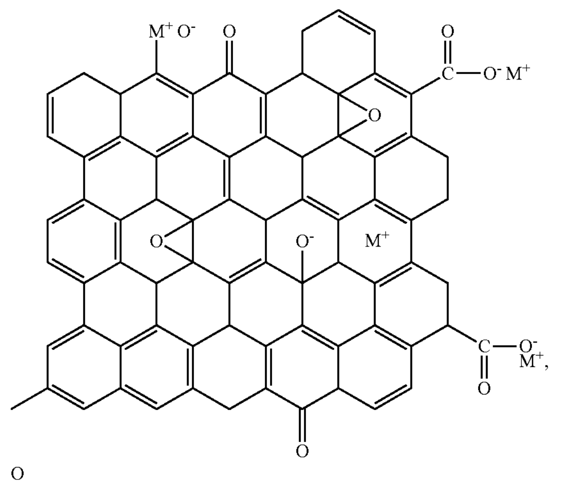

wherein M is K, Na or Li.

4. The liquid phase according to claim 1, wherein the carbon quantum dot anion is in the form of graphite oxide having anionic forms of a carboxyl functional group or a hydroxyl functional group on the surface thereof.

5. An electrochemical device comprising:

a first electrode;

a second electrode spaced apart from the first electrode; and the liquid phase of claim 1 filled between the first electrode and the second electrode.

6. The electrochemical device of claim 5, wherein a reversible electrochemical redox reaction occurs in at least one of the first electrode and the second electrode.

7. The electrochemical device of claim 5, wherein the electrochemical device is a secondary battery, a solar cell, an electrochromic device or an electroluminescent device.

8. The electrochemical device of claim 7, wherein the secondary battery is a lithium ion battery or a lithium polymer battery.

* * * * *